US012804498B2

(12) United States Patent
Choi

(10) Patent No.: US 12,804,498 B2
(45) Date of Patent: Nov. 17, 2026

(54) DEVICE AND METHOD FOR TRANSMITTING/RECEIVING DATA IN NON-TERRESTRIAL AND TERRESTRIAL NETWORK SYSTEMS

(71) Applicant: UUCOM CO., LTD, Gwacheon (KR)

(72) Inventor: Su Han Choi, Gwacheon-si (KR)

(73) Assignee: UUCOM CO., LTD, Gyeonggi-do (KR)

( * ) Notice: Subject to any disclaimer, the term of this patent is extended or adjusted under 35 U.S.C. 154(b) by 698 days.

(21) Appl. No.: 18/016,624

(22) PCT Filed: Jul. 15, 2021

(86) PCT No.: PCT/KR2021/009141

§ 371 (c)(1),
(2) Date: Jan. 17, 2023

(87) PCT Pub. No.: WO2022/015090

PCT Pub. Date: Jan. 20, 2022

(65) Prior Publication Data

US 2023/0292210 A1 Sep. 14, 2023

(30) Foreign Application Priority Data

Jul. 16, 2020 (KR) ........................ 10-2020-0088304
Jul. 12, 2021 (KR) ........................ 10-2021-0090854

(51) Int. Cl.
*H04W 36/00* (2009.01)
*H04W 36/24* (2009.01)
*H04W 36/30* (2009.01)

(52) U.S. Cl.
CPC ....... *H04W 36/304* (2023.05); *H04W 36/249* (2023.05)

(58) Field of Classification Search
CPC ............. H04W 36/304; H04W 36/249; H04W 36/00698; H04W 48/18; H04W 72/12;
(Continued)

(56) References Cited

U.S. PATENT DOCUMENTS 8,260,207 B2 * 9/2012 Srinivasan ............ H04W 16/08 370/335
8,937,925 B2 * 1/2015 Hayashi ............ H04W 36/0016 370/328

(Continued)

FOREIGN PATENT DOCUMENTS

KR 10-0769989 10/2007
KR 10-2016-0130301 11/2016
WO WO-2020119621 A1 * 6/2020 .......... H04W 36/362

OTHER PUBLICATIONS

Nokia et al., To agree on the remaining NTN-TN service continuity aspects, R2-1913925, 3GPP TSG RAN WG2 Meeting #107bis. Chongqing, China, Oct. 4, 2019.

(Continued)

*Primary Examiner* — Marcos Batista
(74) *Attorney, Agent, or Firm* — INVENSTONE PATENT, LLC

(57) ABSTRACT

Disclosed are a device and a method for transmitting and receiving data in non-terrestrial and terrestrial network systems. According to an embodiment of the present invention, a wireless transmission and reception method performed by a user equipment in an environment where network nodes providing different cell coverages is implemented including the steps of: receiving information indicating a threshold value based on a synchronization signal block (SSB) or a reference signal received power (RSRP) from a first network node which provides a first cell coverage, measuring a channel between the first network node and the user equipment, comparing the channel measurement value with the
(Continued)

threshold value; and on the basis of a result of comparing the channel measurement value with the threshold value, determining whether to initiate connection to a second network node which provides a second cell coverage which at least overlaps the first cell coverage.

16 Claims, 18 Drawing Sheets

(58) Field of Classification Search
CPC ..... H04W 84/06; H04W 74/08; H04W 84/04; H04W 36/083; H04W 36/0077; H04W 36/302
USPC .......................................................... 455/436
See application file for complete search history.

(56) References Cited

U.S. PATENT DOCUMENTS 8,995,393 B2 * 3/2015 Siomina ................ H04W 64/00 455/442
9,031,554 B2 * 5/2015 Kim ...................... H04W 24/10 455/425
9,236,938 B2 * 1/2016 Parkvall ............... H04B 7/2656
9,565,600 B2 * 2/2017 Futaki ............... H04W 36/0085
9,674,752 B2 * 6/2017 Uemura .............. H04L 25/0224
9,883,378 B2 * 1/2018 Mildh ................... H04W 76/25
9,936,515 B2 * 4/2018 Fujishiro ............... H04W 36/38
10,149,212 B2 * 12/2018 Frenger ............. H04W 36/0085
10,708,740 B2 * 7/2020 Jang ........................ H04W 4/70
10,727,961 B2 * 7/2020 Hwang .............. H04B 7/06952
11,032,783 B2 * 6/2021 Kubota ................. H04W 16/14
11,388,634 B2 * 7/2022 Rom ............... H04W 36/00835
11,395,199 B2 * 7/2022 Luo ....................... H04W 76/11
11,595,928 B2 * 2/2023 Lin ....................... H04L 5/0064
11,647,430 B2 * 5/2023 Dinan ................... H04L 5/0073 375/267
11,902,815 B2 * 2/2024 Hong .................... H04W 48/16
12,052,614 B2 * 7/2024 Vaidya ............ H04W 36/00838
12,231,968 B2 * 2/2025 Teyeb ............... H04W 36/0058
12,389,291 B2 * 8/2025 Jin .................... H04W 74/0833
2008/0049677 A1 * 2/2008 Hayashi ................ H04W 36/12 370/331
2012/0287908 A1 * 11/2012 Hayashi ................ H04W 36/08 370/331
2014/0213275 A1 * 7/2014 Chou .................. H04W 72/542 455/452.2
2016/0330612 A1 * 11/2016 Mildh ..................... H04W 8/24
2020/0314673 A1 * 10/2020 Deogun ................ H04W 24/08
2022/0039044 A1 * 2/2022 Wu ....................... H04W 48/12
2022/0369178 A1 * 11/2022 Liu ................... H04W 36/0058
2023/0216581 A1 * 7/2023 Stanwood .......... H04B 7/18578 398/125
2025/0247754 A1 * 7/2025 Roy .................. H04W 36/0085

OTHER PUBLICATIONS

CMCC, Considerations on Timing Advance and RACH for Non-Terrestrial, R1-1912536, 3GPP TSG RAN WGI #99, Reno, Nevada, USA, Nov. 9, 2019.
Fraunhofer Iis et al., NR-NTN: Tracking Areas Management, R2-1818593, 3GPP TSG RAN WG2 Meeting #104, Spokane, USA. Nov. 17, 2018.
International Search Report for International Application No. PCT/KR2021/009141, dated Oct. 28, 2021.
Written Opinion mailed on Oct. 28, 2021 for International Application No. PCT/KR2021/009141 and its English translation.
Interdigital, "TP on NTP Mobility issues and solutions", 3GPP RAN WG2 Meeting $107bis, Chongqing, China, Oct. 14-Oct. 18, 2019, R2-1913605 (Revision of R2-1910962).
Thales, "NTN hand-over types", 3GPP TSG RAN WG3 Meeting #102, Spokane, USA, Nov. 12-16, 2018, R3-186729.
CENC, "Consideration on LEO mobility in NTN", 3GPP TSG-RAN WG2 Meeting #107bis, Chongqing, China, Oct. 14-18, 2019, R2-1913927.
Non-final Office Action mailed on Apr. 30, 2024 from the Korean Patent Office for Korean Application No. 10-2021-0090854.

* cited by examiner

DEVICE AND METHOD FOR TRANSMITTING/RECEIVING DATA IN NON-TERRESTRIAL AND TERRESTRIAL NETWORK SYSTEMS

BACKGROUND

Field

The present disclosure relates to a wireless communication system, and more particularly, to an apparatus and method for transmitting and receiving data in non-terrestrial and terrestrial network systems.

Related Art

3GPP opened a new field for the commercial application of 5G by completing the first global 5G New Radio (NR) standard in Release (Rel)-15. In addition, NR-based non-terrestrial networks (NTNs) have been considered to be one of the evolutionary stages of NR for the revitalization of 5G and the expansion of the ecosystem. NTN's extensive service coverage capabilities and reduced vulnerability to physical attacks and natural disasters on its space/aerospace platforms enable NTN to deliver 5G services in a cost-effective manner in areas where terrestrial 5G networks are not available (isolated or remote areas, aboard aircraft or ships) and in areas where services are weak (suburbs or rural areas). It also provides service continuity to passengers aboard M2M and IoT devices or mobile platforms (aircraft, ships, high-speed trains, buses, etc.), or enables reliable 5G service support that is ubiquitous for key communications such as rail, sea, and air communications of the future. In addition, efficient multicast/broadcast resources for data delivery to a network edge or user terminal can be provided to support the availability of 5G networks. These benefits can be provided through a stand-alone NTN or an integrated network of terrestrial and non-terrestrial and are expected to have an impact in areas such as transportation, public safety, media and entertainment, eHealth, energy, agriculture, finance, and automotive.

The NR-based NTN standardization research of the 3GPP RAN working group (WG) is started by the approval of Rel-15 study item (SI) for RAN plenary and RANI in RAN #75, which is a RAN plenary conference in March of 2017. The purpose of the SI was a channel model development of NTN and NTN scenarios, and the study of the influence of NR, which are summarized in the technical report (TR) TR 38.811. Based on this, the standard issue for which the NTN standardization is required was proposed by Rel-16 item, which was approved as Rel-16 in RAN #80 conference on June 2018.

SUMMARY

The present disclosure is to provide an apparatus and method for performing data transmission and reception in non-terrestrial and terrestrial network systems.

According to an aspect of the present disclosure, a method for performing wireless transmission and reception, performed by a user equipment, is provided in an environment in which network nodes provide different cell coverages. The method includes receiving, from a first network node that provides a first cell coverage, information indicating a threshold value based on a synchronization signal block (SSB) or a reference signal received power (RSRP), measuring a channel between the first network node and the user equipment, comparing the channel measurement value with the threshold value; and determining whether to initiate a connection to a second network node that provides a second cell coverage of which at least a partial region is overlapped with the first cell coverage based on the comparison between the channel measurement value and the threshold value.

According to another aspect of the present disclosure, the method further includes maintaining the connection to the first network node when the channel measurement value is equal to or greater than the threshold value, and initiating the connection to the second network node when the channel measurement value is smaller than the threshold value.

According to still another aspect of the present disclosure, the connection to the second network node is initiated in a state in which a connection between the user equipment and the first network node is maintained when the channel measurement value is smaller than the threshold value.

According to still another aspect of the present disclosure, one of the first network node and the second network node is a terrestrial network node, and the other is a non-terrestrial network node.

According to still another aspect of the present disclosure, the method further includes receiving pattern information from the first network node, wherein the pattern information includes at least one of information on a time interval when the second network node passes through an associated region corresponding to an accessible interval of the user equipment in a moving path of the second network node, information on an expected stay time for the associated region, information on the moving path of the second network node, or information on a moving speed of the second network node.

According to still another aspect of the present disclosure, the initiation of the connection to the second network node includes random access for the second network node.

According to still another aspect of the present disclosure, the method further includes receiving, from the first network node, random access configuration information for the second network node and cell-specific information for the second network node.

According to still another aspect of the present disclosure, the method further includes receiving, from the first network node, multiple beams, and performing a beam recovery procedure based on receiving at least one of the multiple beams, wherein performing the beam recovery procedure further includes starting a first timer; and initiating a connection to the second network when the first timer expires.

According to still another aspect of the present disclosure, the first network node and the second network node are associated by a tracking area code (TAC), and the second network node performs paging to the user equipment when the first network node is unable to perform paging to the user equipment.

According to still another aspect of the present disclosure, a user equipment for performing wireless transmission and reception is provided in an environment where network nodes provide different cell coverages. The user equipment includes a transceiver configured to receive, from a first network node which provides a first cell coverage, information indicating a threshold value based on a synchronization signal block (SSB) or a reference signal received power (RSRP), and a processor configured to: measure a channel between the first network node and the user equipment, compare the channel measurement value with the threshold value, and determine an initiation of a connection to a second network node which provides a second cell coverage which is at least overlapped with the first cell coverage based on the comparison between the channel measurement value and the threshold value.

According to still another aspect of the present disclosure, the processor is configured to: maintain the connection to the first network node when the channel measurement value is equal to or greater than the threshold value, and initiate the connection to the second network node when the channel measurement value is smaller than the threshold value.

According to still another aspect of the present disclosure, the connection to the second network node is initiated in a state where a connection between the user equipment and the first network node is maintained when the channel measurement value is smaller than the threshold value.

According to still another aspect of the present disclosure, one of the first network node and the second network node is a terrestrial network node, and the other is a non-terrestrial network node.

According to still another aspect of the present disclosure, the transceiver is configured to receive pattern information from the first network node, and the pattern information includes at least one of information on a time interval when the second network node passes through an associated region corresponding to an accessible interval of the user equipment in a moving path of the second network node, information on an expected stay time for the associated region, information on the moving path of the second network node, or information on a moving speed of the second network node.

According to still another aspect of the present disclosure, the initiation of the connection to the second network node includes random access for the second network node.

According to still another aspect of the present disclosure, the transceiver is configured to receive, from the first network node, random access configuration information for the second network node and cell-specific information for the second network node.

According to still another aspect of the present disclosure, the transceiver is configured to receive multiple beams from the first network node, and wherein the processor is configured to perform a beam recovery procedure based on whether to receive at least one of the multiple beams, wherein the beam recovery procedure is performed by: starting a first timer; and initiating a connection to the second network when the first timer expires.

According to still another aspect of the present disclosure, a method for performing wireless transmission and reception, performed by a first network node which provides a first cell coverage to a user equipment is provided in an environment where network nodes provide different cell coverages. The method includes acquiring information on a cell of a second network node which provides a second cell coverage which is at least overlapped with the first cell coverage, generating, based on the information on a cell of the second network node, information indicating a threshold value based on a synchronization signal block (SSB) or a reference signal received power (RSRP), and transmitting, to the user equipment, the information indicating the threshold value, wherein the threshold value is used to determine whether the user equipment connects to the second network node, and wherein, whether the connection to the user equipment is maintained is determined based on a comparison between a value measured by the user equipment and the threshold value.

According to still another aspect of the present disclosure, a first network node that provides a first cell coverage to a user equipment is provided in an environment where network nodes provide different cell coverages. The first network node includes a processor configured to acquire information on a cell of a second network node which provides a second cell coverage which is at least overlapped with the first cell coverage, and generate, based on the information for a cell of the second network node, information indicating a threshold value based on a synchronization signal block (SSB) or a reference signal received power (RSRP); and a transceiver configured to transmit, to the user equipment, the information indicating the threshold value, wherein the threshold value is used to determine whether the user equipment connects to the second network node, and wherein, whether the connection to the user equipment is maintained is determined based on a comparison between a value measured by the user equipment and the threshold value.

Technical Effect

In at least one cell edge of a terrestrial network cell or a non-terrestrial network cell included in terrestrial and non-terrestrial network systems, more efficient data transmission and reception are available. In addition, more efficient random access performance is available.

DESCRIPTION OF EXEMPLARY EMBODIMENTS

Figure 1:
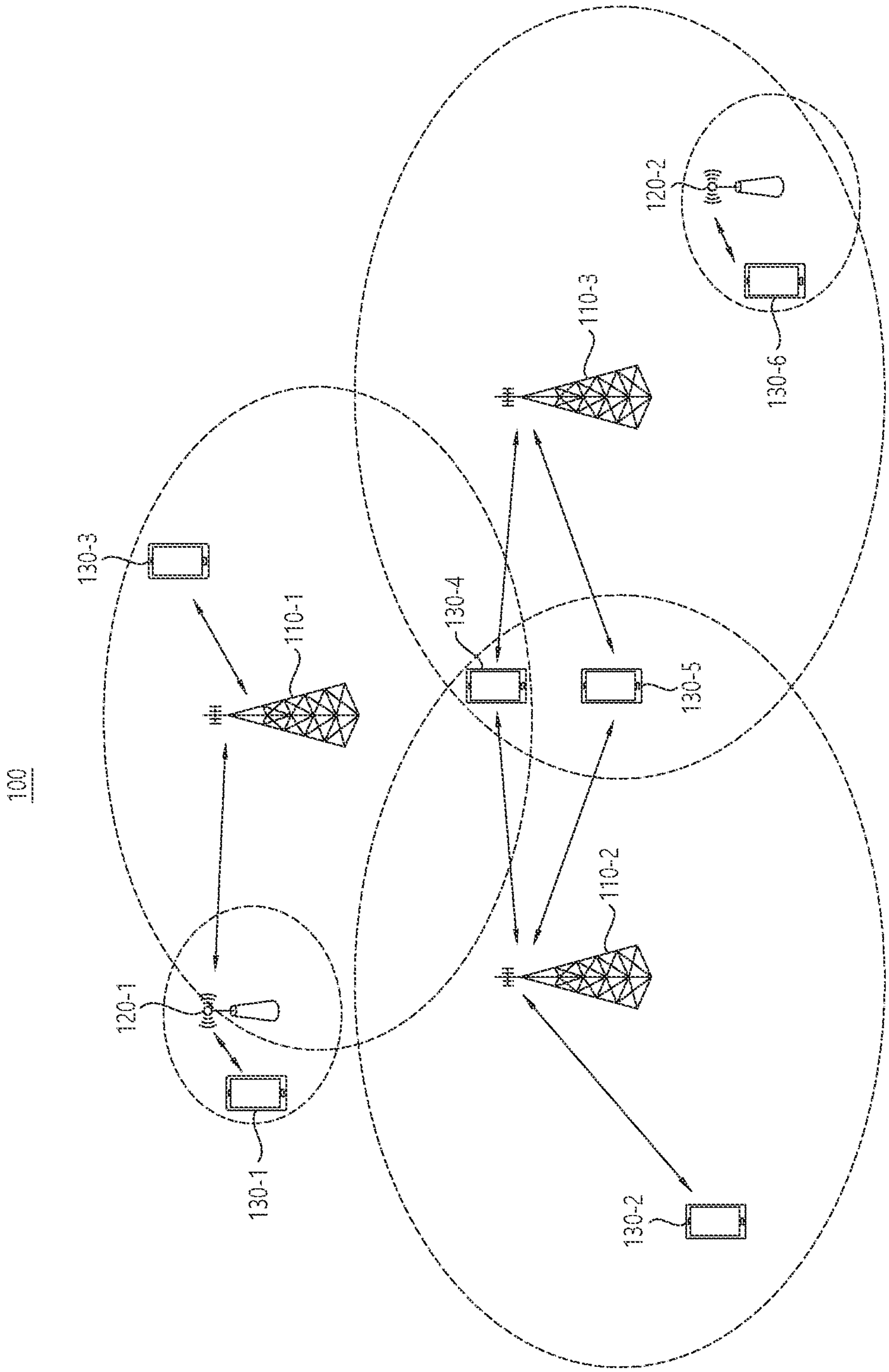
FIG. 1 is a conceptual diagram illustrating a wireless communication system according to an embodiment of the present invention.

While the present invention is susceptible to various modifications and alternative forms, specific embodiments thereof are shown by way of example in the drawings. However, the present invention should not be construed as limited to the embodiments set forth herein, but on the contrary, the disclosure is to cover all modifications, equivalents, and alternatives falling within the spirit and scope of the embodiments. In describing each figure, like reference numerals are used for like elements.

While terms, such as "first", "second", "A", "B," etc. may be used to describe various components, such components must not be limited by the above terms. The above terms are used only to distinguish one component from another. For example, without departing from the scope of the present invention, a first component may be referred to as a second component, and similarly, a second component may also be referred to as a first component. Further, the term "and/or" includes combinations of a plurality of related listed items or any of a plurality of related listed items.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The terms used in the present description are merely used in order to describe particular embodiments, and are not intended to limit the scope of the present invention. An element described in the singular form is intended to include a plurality of elements unless the context clearly indicates otherwise. In the present description, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Unless otherwise defined, all terms including technical and scientific terms used in the present description have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Hereinafter, preferred embodiments according to the present invention will be described in detail with reference to the accompanying drawings.

FIG. 1 is a conceptual diagram illustrating a wireless communication system according to an embodiment of the present invention.

Referring to FIG. 1, the wireless communication system 100 may include a plurality of communication nodes 110-1, 110-2, 110-3, 120-1, 120-2, 130-1, 130-2, 130-3, 130-4, 130-5, and 130-6.

Each of the plurality of communication nodes may support at least one communication protocol. For example, each of the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier (SC)-FDMA based communication protocol, a non-orthogonal multiplexing access (NOMA) based communication protocol, a space division multiple access (SDMA) based communication protocol, and the like.

The wireless communication system 100 may include a plurality of base stations 110-1, 110-2, 110-3, 120-1, and 120-2 and a plurality of UEs 130-1, 130-2, 130-3, 130-4, 130-5, and 130-6).

Each of the first base station 110-1, the second base station 110-2, and the third base station 110-3 may form a macro cell. Each of the fourth base station 120-1 and the fifth base station 120-2 may form a small cell. The fourth base station 120-1, the third UE 130-3, and the fourth UE 130-4 may belong to the coverage of the first base station 110-1. The second UE 130-2, the fourth UE 130-4, and the fifth UE 130-5 may belong to the coverage of the second base station 110-2. The fifth base station 120-2, the fourth UE 130-4, the fifth UE 130-5, and the sixth UE 130-6 may belong to the coverage of the third base station 110-3. The first UE 130-1 may belong to the coverage of the fourth base station 120-1. The sixth UE 130-6 may belong to the coverage of the fifth base station 120-2.

Here, each of the plurality of base stations 110-1, 110-2, 110-3, 120-1, and 120-2 may also be called a NodeB, an evolved NodeB, a next generation Node B (gNB), a base transceiver station (BTS), a radio base station, a radio transceiver, an access point, an access node, a road side unit (RSU), a digital unit (DU), a cloud digital unit (CDU), a radio remote head (RRH), a radio unit (RU), a transmission point (TP), a transmission and reception point (TRP), a relay node, and the like. Each of the plurality of UEs 130-1, 130-2, 130-3, 130-4, 130-5, and 130-6 may also be called a user equipment, an access terminal, a mobile terminal, a station, a subscriber station, a mobile station, a portable subscriber station, a node, a device, and the like.

The plurality of communication nodes 110-1, 110-2, 110-3, 120-1, 120-2, 130-1, 130-2, 130-3, 130-4, 130-5, and 130-6 may support long term evolution (LTE), LTE-Advanced (LTE-A), New Radio (NR), and the like defined in cellular communication (e.g., 3rd generation partnership project (3GPP)) standards. The plurality of base stations 110-1, 110-2, 110-3, 120-1, and 120-2 may operate in different frequency bands or may operate in the same frequency band. The plurality of base stations 110-1, 110-2, 110-3, 120-1, and 120-2 may be connected to each other through an ideal backhaul or a non-ideal backhaul and may exchange information through an ideal backhaul or a non-ideal backhaul. Each of the plurality of base stations 110-1, 110-2, 110-3, 120-1, and 120-2 may be connected to a core network (not shown) through an ideal backhaul or a non-ideal backhaul. Each of the plurality of base stations 110-1, 110-2, 110-3, 120-1, and 120-2 may transmit a signal received from the core network to corresponding UEs 130-1, 130-2, 130-3, 130-4, 130-5, and 130-6 and transmit signals received from the corresponding UEs 130-1, 130-2, 130-3, 130-4, 130-5, and 130-6 to the core network.

Each of the plurality of base stations 110-1, 110-2, 110-3, 120-1, and 120-2 may support OFDM-based downlink transmission, and may support OFDM or DFT-Spread-OFDM-based uplink transmission. In addition, each of the plurality of base stations 110-1, 110-2, 110-3, 120-1, and 120-2 may support multiple input multiple output (MIMO) (e.g., single user (SU)-MIMO, multi-user (MU)-MIMO, massive MIMO, etc.), coordinated multipoint (CoMP) transmission, carrier aggregation transmission, transmission in an unlicensed band, device-to-device (D2D) communication (or proximity services (ProSe)), and the like. Here, each of the plurality of UEs 130-1, 130-2, 130-3, 130-4, 130-5, and 130-6 may perform operations corresponding to the base stations 110-1, 110-2, 110-3, 120-1, and 120-2 and/or operations supported by the base stations 110-1, 110-2, 110-3, 120-1, and 120-2.

For example, the second base station 110-2 may transmit a signal to the fourth UE 130-4 based on SU-MIMO, and the fourth UE 130-4 may receive the signal from the second base station 110-2 according to SU-MIMO. The second base station 110-2 may transmit a signal to the fourth UE 130-4 and the fifth UE 130-5 based on MU-MIMO, and the fourth UE 130-4 and the fifth UE 130-5 may receive the signal from the second base station 110-2 according to MU-MIMO. Each of the first base station 110-1, the second base station 110-2, and the third base station 110-3 may transmit a signal to the fourth UE 130-4 based on CoMP, and the fourth UE 130-4 may receive signals from the first base station 110-1, the second base station 110-2, and the third base station 110-3 according to CoMP. Each of the plurality of base stations 110-1, 110-2, 110-3, 120-1, and 120-2 may transmit/receive a signal to/from the UEs 130-1, 130-2, 130-3, 130-4, 130-5, and 130-6 belonging to the coverage thereof based on CA.

Each of the first base station 110-1, the second base station 110-2, and the third base station 110-3 may coordinate D2D communication with the fourth UE 130-4 and the fifth UE 130-5, and each of the fourth UE 130-4 and the fifth UE 130-5 may perform D2D communication according to coordination of each of the second base station 110-2 and the third base station 110-3.

When a method (e.g., transmission or reception of a signal) performed by a first communication node among communication nodes is described, a second communication node corresponding thereto may perform a method (e.g., reception or transmission of a signal) corresponding to the method performed by the first communication node. That is, when the operation of a UE is described, the corresponding base station may perform the operation corresponding to the operation of the UE. On the other hand, when the operation of a base station is described, the corresponding UE may perform the operation corresponding to the operation of the base station.

Hereinafter, downlink (DL) means communication from a base station to a UE, and uplink (UL: uplink) means communication from a UE to a base station. In downlink, a transmitter may be a part of a base station and a receiver may be a part of a UE. In uplink, a transmitter may be a part of a UE and a receiver may be a part of a base station.

With the recent rapid spread of smartphones and Internet of Things (IoT) UEs, the amount of information exchanged through a communication network is increasing. Accordingly, it is necessary to consider an environment (e.g., enhanced mobile broadband communication) that provides faster services to more users than the existing communication system (or the existing radio access technology) in next-generation wireless access technology. To this end, design of a communication system in consideration of machine type communication (MTC) providing services by connecting a plurality of devices and objects is under discussion. In addition, design of a communication system (e.g., ultra-reliable and low latency communication (URLLC)) considering services and/or UEs sensitive to communication reliability and/or latency is under discussion.

Hereinafter, for convenience of description, the next-generation radio access technology is referred to as new radio access technology (RAT), and a wireless communication system to which the new RAT is applied is referred to as a New Radio (NR) system in the present description. In the present description, frequencies, frames, subframes, resources, resource blocks, regions, bands, subbands, control channels, data channels, synchronization signals, various reference signals, various signals or various messages related to NR may be interpreted in various meanings used in the past and present or will be used in the future.

Figure 2:
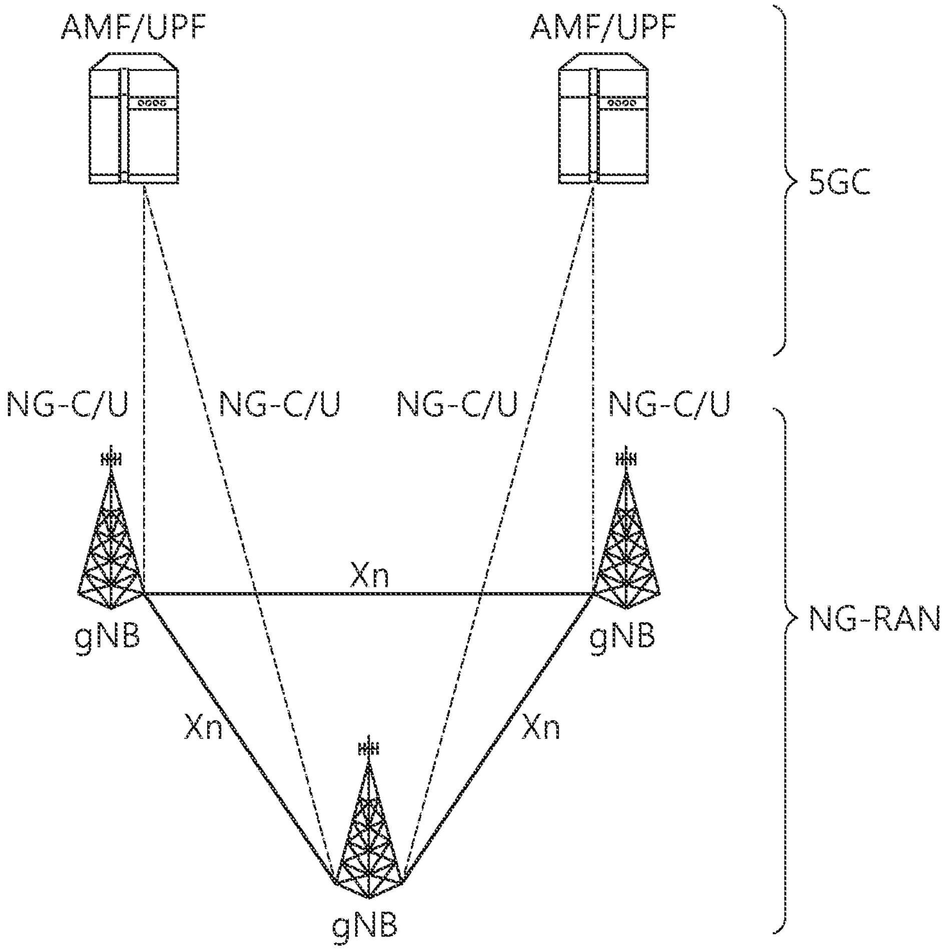
FIG. 2 is an exemplary diagram showing an NR system to which a data transmission method according to an embodiment of the present invention can be applied.

FIG. 2 is an exemplary diagram showing an NR system to which a data transmission method according to an embodiment of the present invention can be applied.

NR, which is next-generation wireless communication technology that is being standardized in 3GPP, provides an improved data rate compared to LTE and can satisfy various QoS requirements for each segmented and detailed usage scenario. In particular, enhanced mobile broadband (eMBB), massive MTC (mMTC), and ultra-reliable and low latency communications (URLLC) have been defined as representative usage scenarios of NR. As a method for satisfying requirements for each scenario, a frame structure that is flexible compared to LTE is provided. The frame structure of NR supports a frame structure based on multiple subcarriers. A basic subcarrier spacing (SCS) is 15 kHz, and a total of 5 types of SCS are supported at 15 kHz*2^n (n=0, 1, 2, 3, 4).

Referring to FIG. 2, a next generation-radio access network (NG-RAN) includes gNBs that provide an NG-RAN user plane (SDAP/PDCP/RLC/MAC/PHY) and control plane (RRC) protocol termination for UEs. Here, NG-C represents a control plane interface used for an NG2 reference point between NG-RAN and 5-generation core (5GC). NG-U represents a user plane interface used for an NG3 reference point between NG-RAN and 5GC.

The gNBs are interconnected through the Xn interface and connected to the 5GC through an NG interface. More specifically, a gNB is connected to an access and mobility management function (AMF) through the NG-C interface and connected to a user plane function (UPF) through the NG-U interface.

In the NR system of FIG. 2, multiple numerologies may be supported. Here, numerology may be defined by a subcarrier spacing and a cyclic prefix (CP) overhead. In this case, a plurality of subcarrier spacings may be derived by scaling the basic subcarrier spacing with an integer. Further, even though it is assumed that a very low subcarrier spacing is not used at a very high carrier frequency, a numerology to be used can be selected independently of the frequency band.

In addition, in the NR system, various frame structures according to a number of numerologies may be supported.

<NR Waveform, Numerology, and Frame Structure>

In NR, a CP-OFDM waveform using a cyclic prefix is used for downlink transmission, and CP-OFDM or DFT-S-OFDM is used for uplink transmission. OFDM technology is easy to combine with MIMO (Multiple Input Multiple Output) and has advantages of using a low-complexity receiver with high frequency efficiency.

In NR, since requirements for a data rate, a delay rate, coverage, and the like are different for each of the three scenarios described above, it is necessary to efficiently satisfy the requirements for each scenario through a frequency band constituting an arbitrary NR system. To this end, technology for efficiently multiplexing radio resources based on a plurality of different numerologies has been proposed.

Specifically, NR transmission numerology is determined based on a sub-carrier spacing and a cyclic prefix (CP) and changed using a value μ as an exponential value of 2 based on 15 kHz as shown in Table 1 below.

TABLE 1

| μ | Subcarrier spacing (kHz) | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1, NR numerologies may be divided into five types according to the subcarrier spacing. This is different from the fact that the subcarrier spacing of LTE, one of the 4G communication technologies, is fixed to 15 kHz. Specifically, subcarrier spacings used for data transmission are 15, 30, 60, and 120 kHz, and subcarrier spacings used for synchronization signal transmission are 15, 30, 120 and 240 kHz in NR. In addition, an extended CP is applied only to the 60 kHz subcarrier spacing. On the other hand, in the frame structure in NR, a frame composed of 10 subframes each having a length of 1 ms and having a length of 10 ms is defined. One frame can be divided into half frames of 5 ms, and each half frame includes 5 subframes. In the case of a 15 kHz subcarrier spacing, one subframe is composed of one slot, and each slot includes 14 OFDM symbols.

<NR Physical Resources>

With respect to physical resources in NR, an antenna port, a resource grid, a resource element, a resource block, a bandwidth part, etc. are considered.

An antenna port is defined such that a channel on which a symbol on an antenna port is carried can be inferred from a channel on which another symbol on the same antenna port is carried. When the large-scale property of a channel carrying a symbol on one antenna port can be inferred from a channel carrying a symbol on another antenna port, the two antenna ports may be regarded as being in a QC/QCL (quasi co-located or quasi co-location) relationship. Here, the large-scale property includes one or more of delay spread, Doppler spread, Doppler shift, average delay, and spatial Rx parameter.

Figure 3:
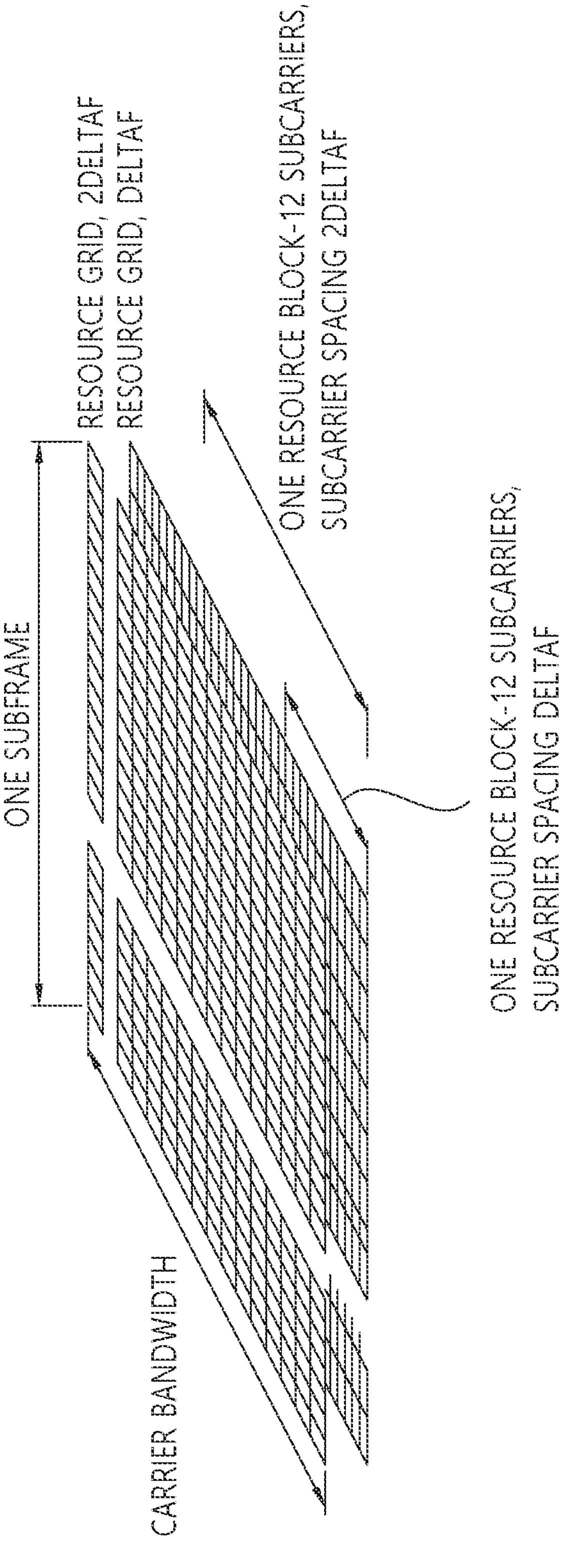
FIG. 3 is a diagram for describing a resource grid supported by the radio access technology to which the present embodiment can be applied.

FIG. 3 is a diagram for describing a resource grid supported by the radio access technology to which the present embodiment can be applied.

Referring to FIG. 3, since NR supports a plurality of numerologies on the same carrier, a resource grid may be present according to each numerology. In addition, the resource grid may be present according to an antenna port, a subcarrier spacing, and a transmission direction.

A resource block is composed of 12 subcarriers and is defined only in the frequency domain. In addition, a resource element is composed of one OFDM symbol and one subcarrier. Accordingly, the size of one resource block may vary according to the subcarrier spacing, as shown in FIG. 3. In addition, "Point A" serving as a common reference point for a resource block grid, a common resource block, a physical resource block, and the like are defined in NR.

Figure 4:
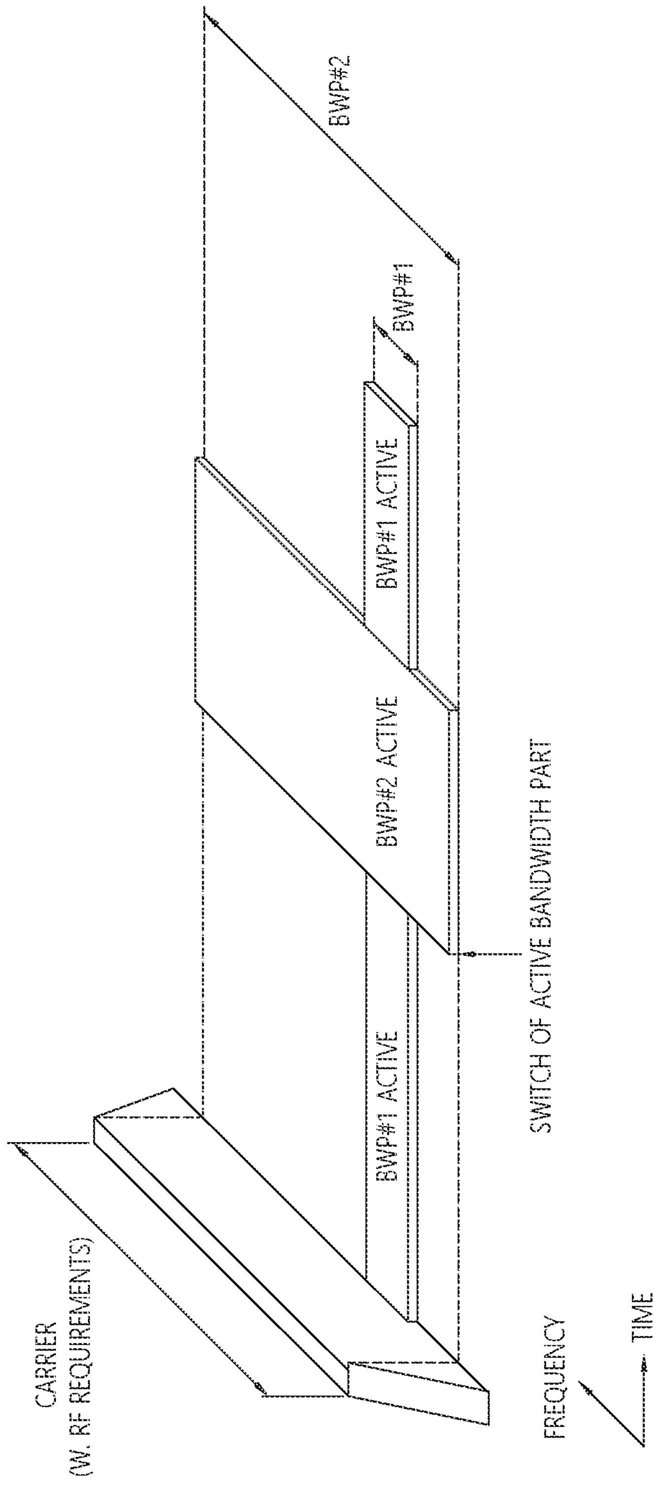
FIG. 4 is a diagram for describing a bandwidth part supported by the radio access technology to which the present embodiment can be applied.

FIG. 4 is a diagram for describing a bandwidth part supported by the radio access technology to which the present embodiment can be applied.

Unlike LTE in which the carrier bandwidth is fixed to 20 MHz, the maximum carrier bandwidth is set to 50 MHz to 400 MHz for each subcarrier spacing in NR. Therefore, it is not assumed that all UEs use all of these carrier bandwidths. Accordingly, as shown in FIG. 4, a bandwidth part (BWP) may be designated within a carrier bandwidth and used by a UE in NR. In addition, a bandwidth part is associated with one numerology and composed of a subset of consecutive common resource blocks, and may be dynamically activated with time. A maximum of four bandwidth parts is configured for a UE in uplink and downlink, and data is transmitted/received using an activated bandwidth part at a given time.

Uplink and downlink bandwidth parts are independently set in the case of a paired spectrum, whereas downlink and uplink bandwidth parts are set in pairs to share a center frequency in order to prevent unnecessary frequency re-tuning between downlink and uplink operations in the case of an unpaired spectrum.

<NR Initial Access>

In NR, a UE performs cell search and random access procedures in order to access a base station and perform communication.

Cell search is a procedure in which a UE synchronizes with a cell of a corresponding base station using a synchronization signal block (SSB) transmitted by the base station, obtains a physical layer cell ID, and obtains system information.

Figure 5:
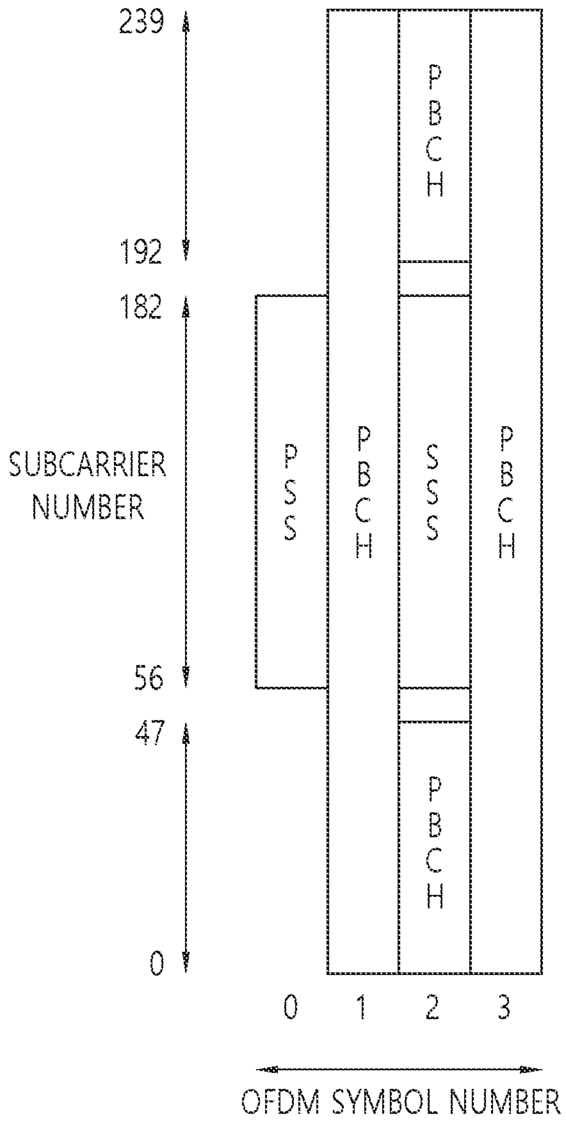
FIG. 5 is a diagram illustrating a synchronization signal block in the radio access technology to which the present embodiment can be applied.

FIG. 5 is a diagram illustrating a synchronization signal block in the radio access technology to which the present embodiment can be applied.

Referring to FIG. 5, the SSB is composed of a primary synchronization signal (PSS) and a secondary synchronization signal (SSS) each occupying one symbol and 127 subcarriers, and a PBCH spanning 3 OFDM symbols and 240 subcarriers.

A UE receives the SSB by monitoring the SSB in the time and frequency domains.

The SSB can be transmitted up to 64 times in 5 ms. A plurality of SSBs is transmitted using different transmission beams within 5 ms, and the UE performs detection on the assumption that SSBs are transmitted every 20 ms when viewed based on one specific beam used for transmission. The number of beams that can be used for SSB transmission within 5 ms may increase as the frequency band increases. For example, a maximum of 4 SSB beams can be transmitted at 3 GHz or less, and SSBs can be transmitted using a maximum of 8 different beams in a frequency band of 3 to 6 GHz and using a maximum of 64 different beams in a frequency band of 6 GHz or more.

Two SSBs are included in one slot, and the start symbol and the number of repetitions in the slot are determined according to a subcarrier spacing as following.

The SSB is not transmitted at the center frequency of a carrier bandwidth, unlike the SS in the conventional LTE. That is, the SSB may be transmitted in a place other than the center of the system band, and a plurality of SSBs may be transmitted in the frequency domain when broadband operation is supported. Accordingly, the UE monitors the SSB using a synchronization raster that is a candidate frequency position for monitoring the SSB. A carrier raster and a synchronization raster, which are center frequency position information of a channel for initial access, are newly defined in NR, and the synchronization raster has a wider frequency interval than the carrier raster and thus can support rapid SSB search of the UE.

The UE may acquire a master information block (MIB) through a PBCH of the SSB. The MIB includes minimum information for the UE to receive remaining minimum system information (RMSI) broadcast by a network. In addition, the PBCH may include information on the position of the first DM-RS symbol in the time domain, information for the UE to monitor SIB1 (e.g., SIB1 numerology information, information related to SIB1 control resource set (CORESET), search space information, PDCCH related parameter information, etc.), offset information between a common resource block and the SSB (the position of the absolute SSB in a carrier is transmitted through SIB1), and the like. Here, the SIB1 numerology information is equally applied to some messages used in the random access procedure for the UE to access the base station after the UE completes the cell search procedure. For example, the SIB1 numerology information may be applied to at least one of messages 1 to 4 for the random access procedure.

The aforementioned RMSI may mean system information block 1 (SIB1), and SIB1 is periodically broadcast (e.g., 160 ms) in the cell. SIB1 includes information necessary for the UE to perform an initial random access procedure and is periodically transmitted through a PDSCH. To receive SIB1, the UE needs to receive numerology information used for SIB1 transmission and control resource set (CORESET) information used for SIB1 scheduling SIB1 through a PBCH. The UE checks scheduling information for SIB1 using an SI-RNTI in CORESET and acquires SIB1 on the PDSCH according to the scheduling information. SIBs other than SIB1 may be transmitted periodically or may be transmitted according to the request of the UE.

Figure 6:
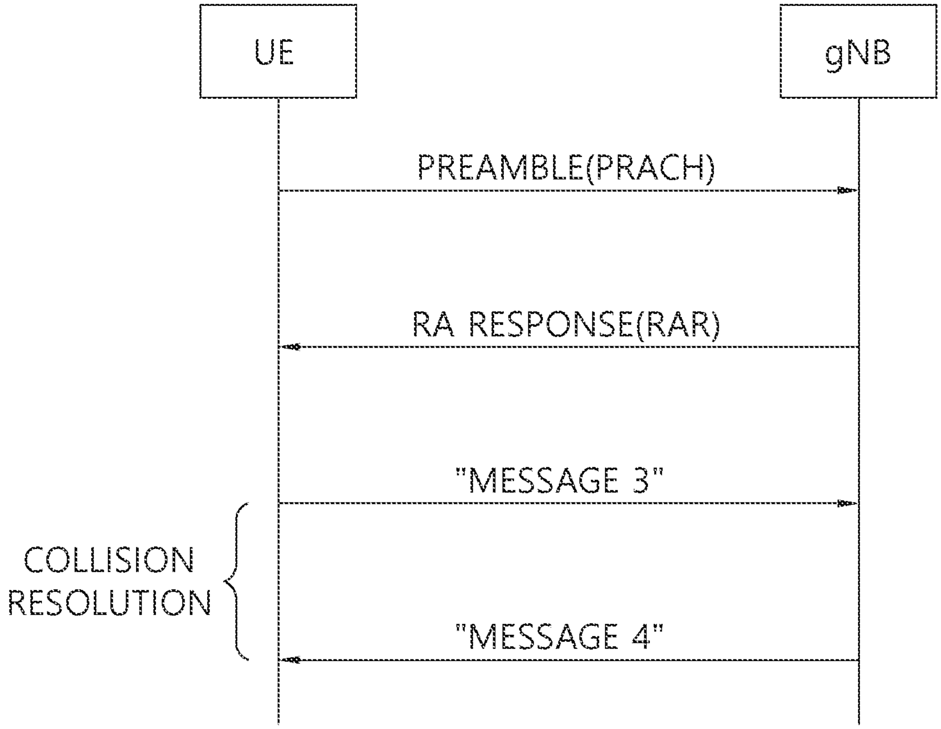
FIG. 6 is a diagram for describing a random access procedure in the radio access technology to which the present embodiment can be applied.

FIG. 6 is a diagram for describing a random access procedure in the radio access technology to which the present embodiment can be applied.

Referring to FIG. 6, upon completion of cell search, the UE transmits a random access preamble for random access to the base station. The random access preamble is transmitted through a PRACH. Specifically, the random access preamble is transmitted to the base station through a PRACH composed of consecutive radio resources in a specific slot that is periodically repeated. In general, when the UE initially accesses the cell, a contention-based random access procedure is performed, and when random access is performed for beam failure recovery (BFR), a contention-free random access procedure is performed.

The UE receives a random access response to the transmitted random access preamble. The random access response may include a random access preamble identifier (ID), a UL grant (uplink radio resource), a temporary cell-radio network temporary identifier (TC-RNTI), and a time advance command (TAC). Since one random access response may include random access response information for one or more UEs, the random access preamble identifier may be included to indicate a UE for which the included UL grant, TC-RNTI, and TAC are valid. The random access preamble identifier may be an identifier for the random access preamble received by the base station. The TAC may be included as information for the UE to adjust uplink synchronization. The random access response may be indicated by a random access identifier on a PDCCH, that is, a random access-radio network temporary identifier (RA-RNTI).

Upon reception of the valid random access response, the UE processes information included in the random access response and performs scheduled transmission to the base station. For example, the UE applies the TAC and stores the TC-RNTI. In addition, the UE transmits data stored in a buffer of the UE or newly generated data to the base station using the UL grant. In this case, information for identifying the UE needs to be included.

Non-Terrestrial Network

A non-terrestrial network refers to a network or a network segment using airborne vehicles such as a high altitude platform (HAPS) or a spaceborne vehicle such as a satellite. According to NTN defined in 3GPP, an artificial satellite is a network node that is connected to a UE through wireless communication and provides a wireless access service to the UE. In one aspect, a satellite in NTN may be configured to perform the same or similar functions and operations as a base station in a terrestrial network. In this case, from the viewpoint of a UE, the artificial satellite may be recognized as another base station. In that respect, the artificial satellite may be included in a base station in a broad sense in the present description. That is, a person skilled in the art can obviously derive an embodiment in which a base station is replaced with a satellite from the embodiments depicting the base station or describing the functions of the base station. Accordingly, even if such embodiments are not explicitly disclosed herein, such embodiments fall within the scope of the present description and the spirit of the present invention.

In 3GPP, technology for supporting NR operation in a non-terrestrial network using the aforementioned satellite or air transport vehicle is being developed. However, in the non-terrestrial network, the distance between a base station and a UE is longer than that in a terrestrial network using terrestrial base stations. Accordingly, a very large round trip delay (RTD) may occur. For example, it is known that RTD is 544.751 ms in an NTN scenario using geostationary earth orbiting (GEO) located at an altitude of 35,768 km, and RTD is 3.053 ms in an NTN scenario using HAPS located at an altitude of 229 km. In addition, RTD in an NTN scenario using a low earth orbiting (LEO) satellite system can be up to 25.76 ms. As such, in order to perform a communication operation to which the NR protocol is applied in a non-terrestrial network, technology for supporting base stations and UEs such that they can perform the NR operation even under such propagation delay.

Figure 7:
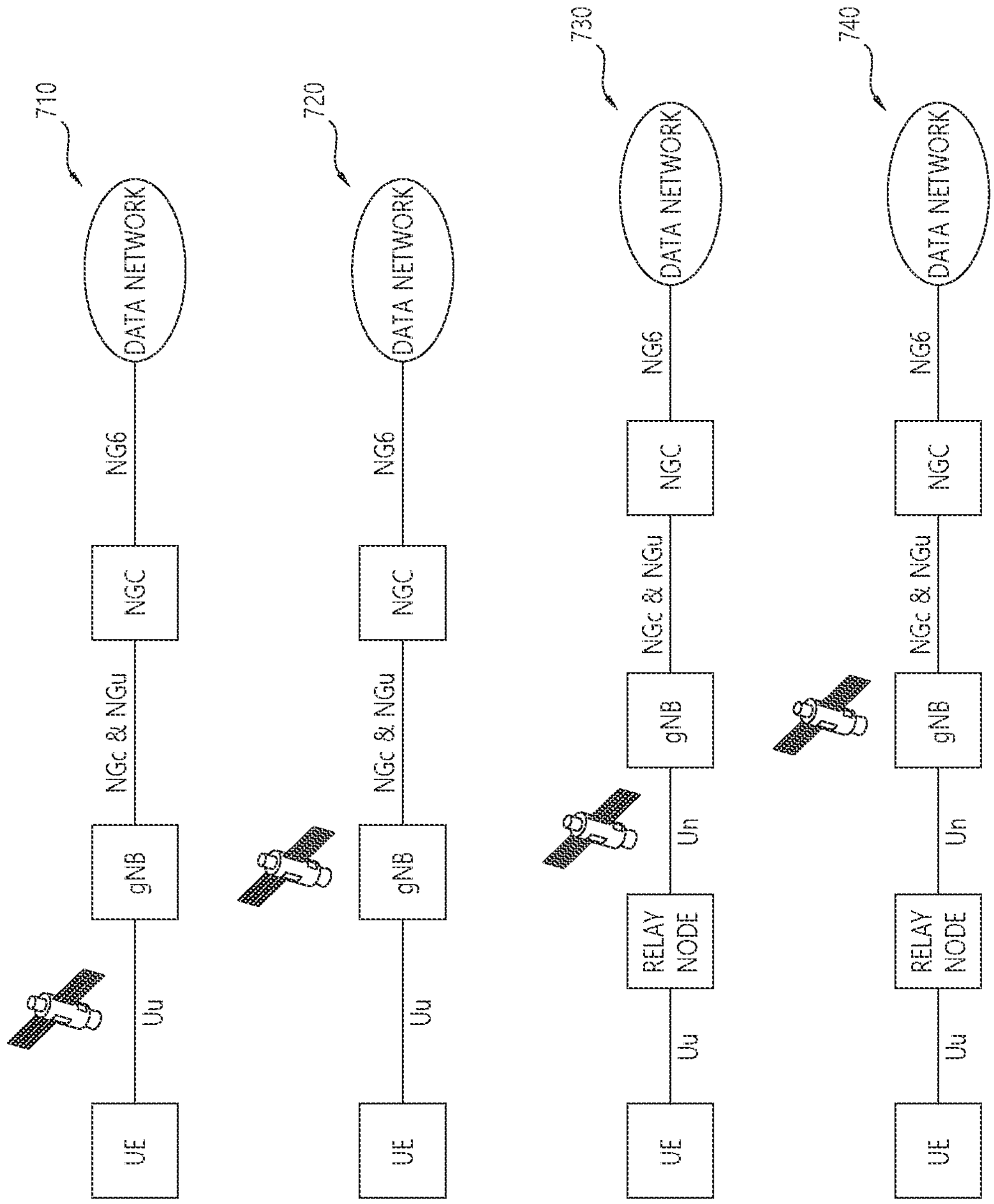
FIG. 7 is a diagram for describing various forms of a non-terrestrial network structure to which an embodiment can be applied.

FIG. 7 is a diagram for describing various forms of a non-terrestrial network structure to which an embodiment can be applied.

Referring to FIG. 7, the non-terrestrial network may be designed in a structure in which a UE performs wireless communication using a device located in the sky. For example, the non-terrestrial network may be implemented in a structure in which a satellite or an air transport device is positioned between a UE and a gNB to relay communication, such as a structure 710. As another example, the non-terrestrial network may be implemented in a structure in which a satellite or an air transport device performs some or all of the functions of a gNB to perform communication with a UE, such as a structure 720. As another example, the non-terrestrial network may be implemented in a structure in which a satellite or an air transport device is positioned between a relay node and a gNB to relay communication, such as a structure 730. As another example, the non-terrestrial network may be implemented in a structure in which a satellite or an air transport device performs some or all of the functions of a gNB to perform communication with a relay node, such as a structure 740.

Accordingly, a component for performing communication with a UE in connection with a core network is described as a network node or a base station in the present description, but this may refer to the aforementioned airborne vehicles or spaceborne vehicles. If necessary, a network node or a base station may mean the same device, or may be used to distinguish different devices according to a non-terrestrial network structure.

That is, a network node or a base station refers to a device for transmitting/receiving data to/from a UE in a non-terrestrial network structure and controlling an access procedure and a data transmission/reception procedure of the UE. Accordingly, when airborne vehicles or spaceborne vehicles perform some or all of the functions of the base station, the network node or the base station may refer to an airborne vehicle or a spaceborne vehicle. Alternatively, when airborne vehicles or spaceborne vehicles execute a function of relaying signals of separate terrestrial base stations, the network node or the base station may refer to a terrestrial base station.

Each embodiment provided below may be applied to an NR UE through an NR base station or may be applied to an LTE UE through an LTE base station. In addition, each embodiment provided below may be applied to an LTE UE connected to an eLTE base station connected through a 5G system (or 5G core network), and applied to an E-UTRANR dual connectivity (EN-DC) UE or an NR E-UTRA dual connectivity (NE-DC) UE that simultaneously provides LTE and NR wireless connection.

Figure 8:
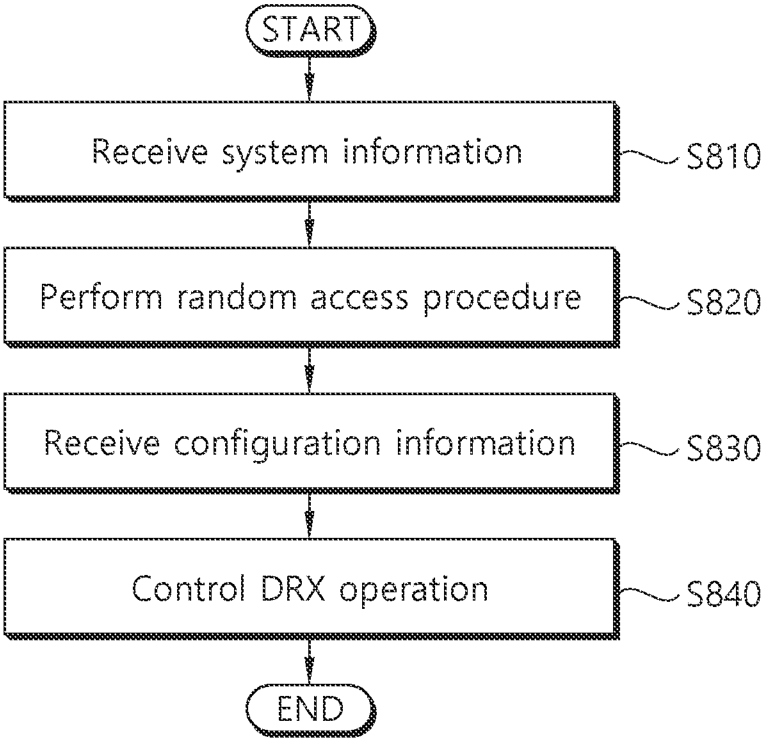
FIG. 8 is a flowchart illustrating a UE operation according to an embodiment of the present disclosure.

FIG. 8 is a flowchart illustrating a UE operation according to an embodiment of the present disclosure.

Referring to FIG. 8, a UE that performs communication using a non-terrestrial network may perform a step of receiving system information including reference round-trip delay offset information of a non-terrestrial network cell (S810). For example, the reference round-trip delay offset information may be determined based on a signal delivery time between a UE and a network node. In one example, the reference round-trip delay offset information may be determined based on a difference between the time of transmitting a signal by a UE or a network node and the time of receiving the signal by the network or the UE. In another example, the reference round-trip delay offset information may also be determined based on a difference between the time of transmitting a signal by a UE and the time of receiving the signal by another UE.

The reference round-trip delay offset information may be included in the system information transmitted by a network node and received in a UE. The reference round-trip delay offset information may be included in the system information in an explicit or implicit format.

The UE may perform a step of performing a random access procedure in a non-terrestrial network cell (step S820). For example, after receiving the system information, the UE may perform a random access procedure to access a network node by using a non-terrestrial network.

In one example, in the case of the contention-based random access procedure, the UE may perform a step of transmitting message 3 (MSG 3), after transmitting MSG 3, a step of starting a timer for contention resolution, when the time according to the reference round-trip delay offset information is elapsed, and a step of stopping the timer when the contention resolution is completed. That is, when the time of the reference round-trip delay offset information is elapsed after transmitting MSG 3, the UE monitors a reception of MSG 4. To determine whether the contention resolution is completed, when the time of the reference round-trip delay offset information is elapsed, the UE starts the timer for contention resolution, and when MSG 4 is normally received, the UE stops the timer and complete the random access procedure.

In another example, in the case of the 2-step random access procedure, the UE may perform a step of transmitting message A (MSG A), after transmitting MSG A, a step of starting a response timer when the time according to the reference round-trip delay offset information is elapsed, and a step of stopping the response timer, when MSG B, which is a response message to MSG A, is received. That is, in the case of the 2-step random access procedure including MSG A transmission and MSG B reception, when the time of the reference round-trip delay offset information is elapsed after transmitting MSG A, the UE monitors a reception of MSG B by starting the response timer. Later, MSG B is normally received, the UE stops the response timer and completes the random access procedure.

The above-described random access procedure is described in more detail with reference to the drawing below.

Meanwhile, the UE may perform a step of receiving configuration information required to perform communication by using a non-terrestrial network cell (step S830). For example, the configuration information may include a discontinuity reception HARQ RTT (drx HARQ Round Trip Time) timer or an SR (Scheduling Request) prohibition timer. Here, the discontinuity reception HARQ RTT (drx HARQ Round Trip Time) timer or the SR (Scheduling Request) prohibition timer may be set to a value greater than the reference round-trip delay offset.

The UE may perform a step of controlling a discontinuity reception (DRX) operation based on the configuration information (step S840). For example, the UE may perform the DRX operation by using a timer or the like included in the configuration information.

In one example, the UE performs the DRX operation based on the HARQ RTT (drx HARQ Round Trip Time) timer. In addition, when a deactivation (disable) indication for a HARQ feedback operation is received, the UE may deactivate the discontinuity reception HARQ RTT (drx HARQ Round Trip Time) timer. That is, when a network node instructs a deactivation for the HARQ feedback operation, the UE may deactivate the discontinuity reception HARQ RTT (drx HARQ Round Trip Time) timer and may not perform the HARQ feedback operation.

In another example, the UE may perform a scheduling request operation based on the SR (Scheduling Request) prohibition timer.

As such, the UE may reflect a delay time increase according to a non-terrestrial network by using a MAC procedure and process the reference round-trip delay offset information received from a base station.

Hereinafter, the UE operation in the random access procedure which is briefly described above will be described in more detail with reference to the drawings.

Figure 9:
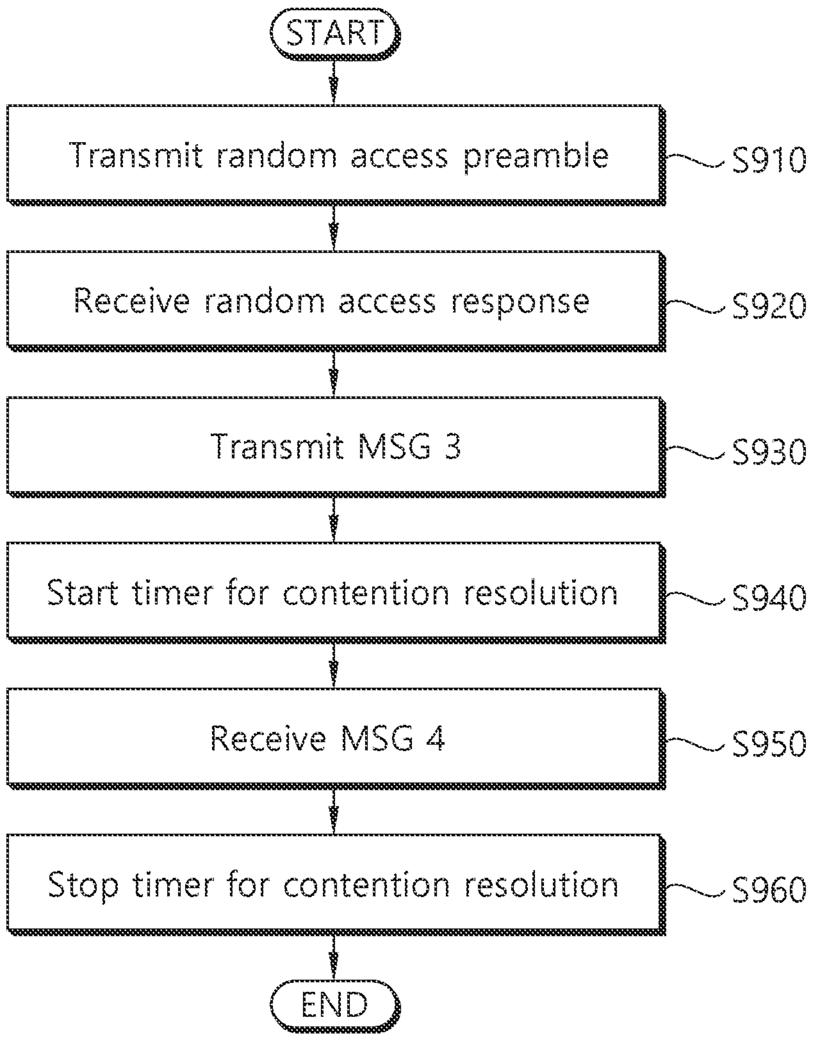
FIG. 9 is a diagram illustrating a contention-based random access operation of a UE according to an embodiment.

FIG. 9 is a diagram illustrating a contention-based random access operation of a UE according to an embodiment.

Referring to FIG. 9, a UE transmits a random access preamble to access a non-terrestrial network cell (step S910). For example, the UE may transmit by selecting one of a predetermined number of preambles by using PRACH.

The UE receives a random access response message including response information in response to the random access preamble (step S920). For example, the UE monitors whether the random access response message is received within a random access response window which is set based on random access preamble transmission resource information. In the case that a random access response message is identified by a temporal identifier related to the random access preamble transmission within the random access response window, the UE receives the random access response message.

Thereafter, the UE transmits MSG 3 including request information for requesting an RRC connection (step S930). For example, MSG 3 may include information for requesting a radio resource allocation required for an uplink transmission.

When a predetermined time is elapsed after MSG 3 is transmitted, the UE that performs an access to the non-terrestrial network cell starts a timer for contention resolution (step S940). For example, the predetermined time may be determined based on the reference round-trip delay offset information through the system information. That is, when MSG 3 is transmitted, after the predetermined time, which is determined based on the reference round-trip delay offset information, is elapsed, the UE starts the timer for contention resolution. Here, the timer for contention resolution may be preconfigured to the UE or received through a separate message.

While the timer for contention resolution is operating, the UE receives MSG 4 including information for contention resolution (step S950). When MSG 4 is received, and the access to the non-terrestrial network cell of the UE is completed, the UE stops the timer for contention resolution (step S960).

Through this, the UE operates the timer for contention resolution by considering the long round-trip delay occurred in a non-terrestrial network environment, and even in the case that MSG 4 is transmitted, a random access procedure failure due to the termination of the timer for contention resolution may be prevented.

Figure 10:
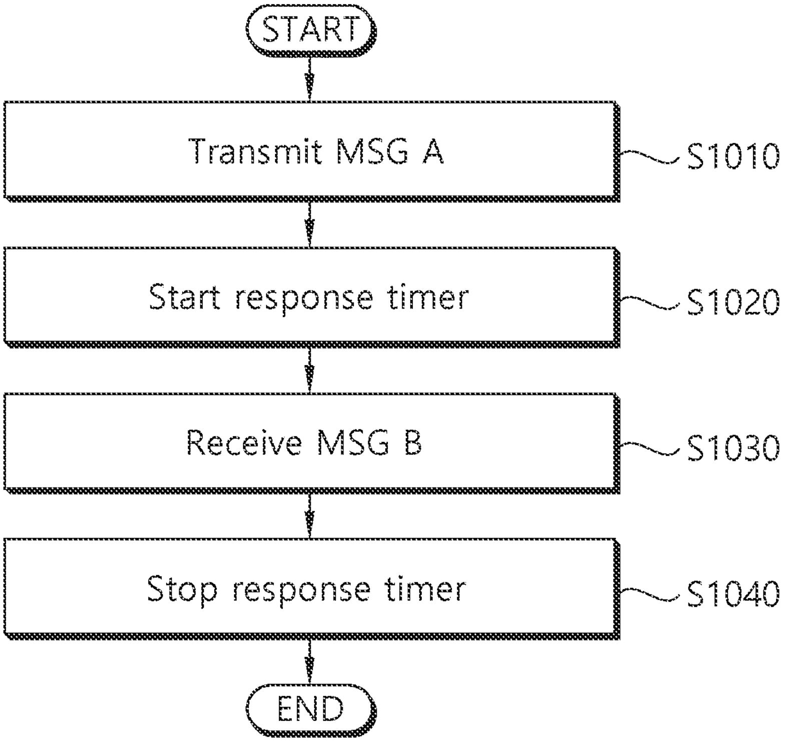
FIG. 10 is a diagram illustrating a 2-step random access operation of a UE according to an embodiment.

FIG. 10 is a diagram illustrating a 2-step random access operation of a UE according to an embodiment.

Referring to FIG. 10, even in the 2-step random access procedure, a UE may determine a timer starting time by using the reference round-trip delay offset information and prevent a random access failure detection according to the termination of the response timer.

The 2-step random access procedure is a technique of simplifying the 4-step random access procedure including the random access preamble transmission, the random access response reception, MSG 3 transmission, and MSG 4 reception described by referring to FIG. 9 into 2-step and supporting a fast random access procedure.

For example, the UE transmits a random access preamble and MSG A including MSG 3 simultaneously (step S1010). The random access preamble is transmitted through PRACH, and MSG 3 is transmitted through PUSCH.

After MSG A is transmitted, the UE starts a response timer after a predetermined delay time which is determined based on the reference round-trip delay offset information (step S1030). For example, the UE starts the response timer after the time included in the reference round-trip delay offset information is elapsed.

The UE monitors whether MSG B is received while the response timer is operating and receives MSG B (step S1030). For example, MSG B includes a part or the whole of the random access response message and the information of MSG 4 shown in FIG. 9.

When MSG B is received, the UE stops the response timer and terminates the random access procedure (step S1040).

As such, the long round-trip delay according to the non-terrestrial network configuration is considered even in the random access procedure, an occurrence of unexpected random access procedure failure may be prevented.

Hereinafter, a base station operation is described, which corresponds to the UE operation described above. The parts of the base station operation in connection with the UE operation are already described above, and may be omitted to prevent unnecessary duplicative description.

Figure 11:
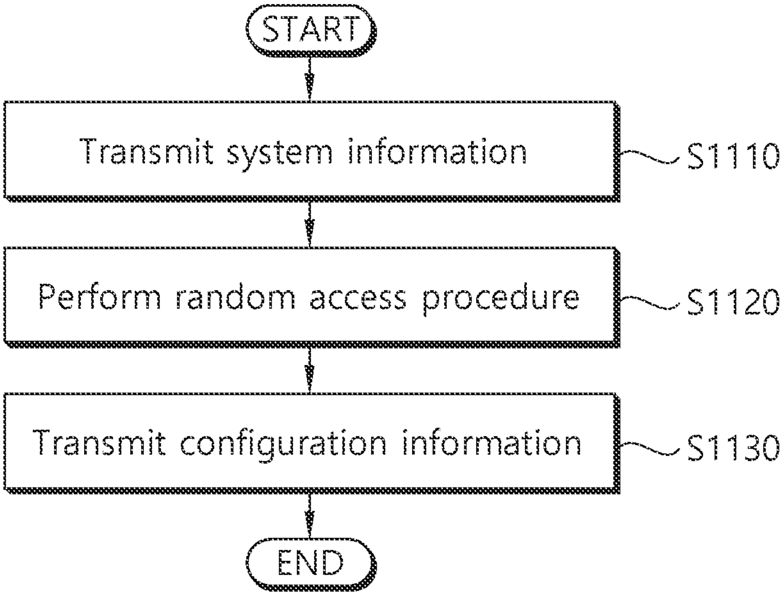
FIG. 11 is a diagram illustrating a network node operation according to an embodiment.

FIG. 11 is a diagram illustrating a network node operation according to an embodiment.

Referring to FIG. 11, a network node that performs communication using a non-terrestrial network may perform a step of receiving system information including reference round-trip delay offset information of a non-terrestrial network cell (S1110). For example, the reference round-trip delay offset information may be determined based on a signal delivery time between a UE and a network node. In one example, the reference round-trip delay offset information may be determined based on a difference between the time of transmitting a signal by a UE or a network node and the time of receiving the signal by the network or the UE. In another example, the reference round-trip delay offset information may also be determined based on a difference between the time of transmitting a signal by a UE and the time of receiving the signal by another UE. In addition, the reference round-trip delay offset information may be included in the system information in an explicit or implicit format.

The network node may perform a step of performing a random access procedure in a non-terrestrial network cell (step S1120). For example, the network node may perform a random access procedure with the UE that is trying to access the network node by using a non-terrestrial network.

In one example, in the case of the contention-based random access procedure, the network node receives message 3 (MSG 3) from the UE. After transmitting MSG 3, when the time according to the reference round-trip delay offset information is elapsed, the UE starts a timer for contention resolution. The network node transmits MSG 4 including response information in response to MSG 3. When the UE receives MSG 4, the UE stops the timer for contention resolution and terminate the random access procedure. That is, when the time of the reference round-trip delay offset information is elapsed after transmitting MSG 3, the UE monitors a reception of MSG 4.

In another example, in the case of the 2-step random access procedure, the network node receives message A (MSG A). After transmitting MSG 3, when the time according to the reference round-trip delay offset information is elapsed, the UE starts a response timer. The network node transmits MSG B, which is a response message to MSG A, to the UE. That is, in the case that the 2-step random access procedure including MSG A transmission and MSG B reception is performed, when the time of the reference round-trip delay offset information is elapsed after transmitting MSG A, the UE monitors a reception of MSG B by starting the response timer. Later, MSG B is normally received, the UE stops the response timer and completes the random access procedure.

The network node may perform a step of transmitting configuration information required to perform communication by using a non-terrestrial network cell (step S1130). For example, the configuration information may include a discontinuity reception HARQ RTT (drx HARQ Round Trip Time) timer or an SR (Scheduling Request) prohibition timer. Here, the discontinuity reception HARQ RTT (drx HARQ Round Trip Time) timer or the SR (Scheduling Request) prohibition timer may be set to a value greater than the reference round-trip delay offset.

Random Access Procedure in a Non-Terrestrial Network

For the uplink synchronization configuration in NR, a UE may transmit a random access preamble for a RACH occasion (RO) to a corresponding network node, and the network node may receive the random access preamble, and then, apply the random access preamble for a synchronization configuration with the UE through a timing advance (TA) estimation. The UE may transmit random access preambles at different times according to delay time differences with the network node, and various random access preamble formats and random access preamble monitoring periods according to various scenarios may be set to the network node to detect multiple random access preambles separately. According to the NR standard, the longest random access preamble format may accept the delay gap of about 0.68 ms between UEs. However, in NTN, since the maximum delay gap may be increased up to 10.3 ms, the maximum delay gap may be overlapped among different preamble receiving windows, and a problem may occur that an RO for a random access preamble received by a network node is ambiguous.

Figure 12:
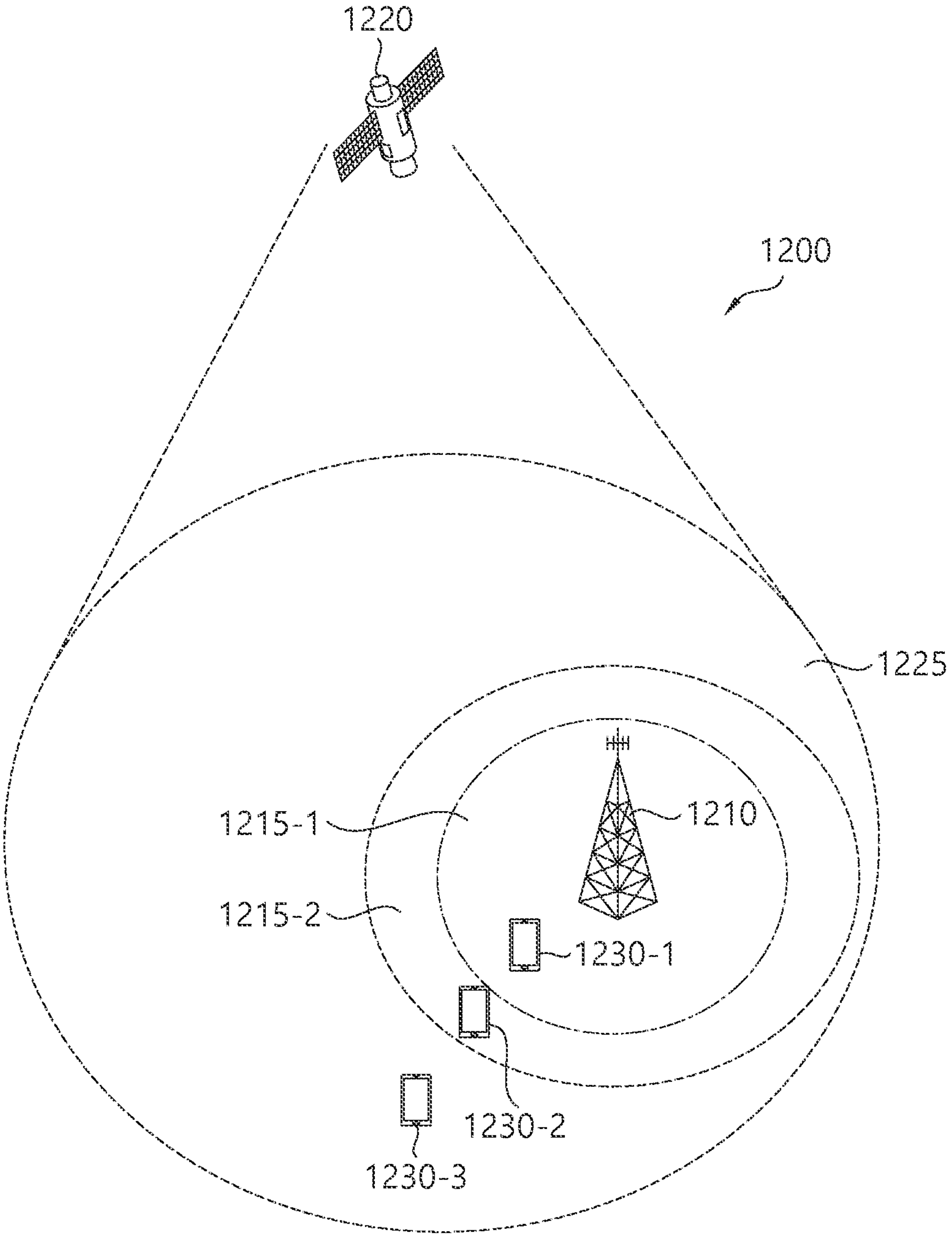
FIG. 12 is a conceptual diagram illustrating a wireless communication system including terrestrial and non-terrestrial network cells according to an embodiment of the present disclosure.

Selective Data Transmission and Reception for Non-Terrestrial and Terrestrial Network Nodes FIG. 12 is a conceptual diagram illustrating a wireless communication system including terrestrial and non-terrestrial network cells according to an embodiment of the present disclosure. As shown in FIG. 12, a wireless communication system 1200 according to an embodiment of the present disclosure may include first network cells 1215-1 and 1215-2 served by a first network node 1210 and a second network cell 1225 served by a second network node 1220. According to an aspect, the first network node 1210 may be a terrestrial network node, and the second network node 1220 may be a non-terrestrial network node. Hereinafter, for the convenience of description, the embodiment is described based on the terrestrial network node 1210 and the non-terrestrial network node 1220, but the first network node and the second network node are not necessarily limited thereto, and the case that both of the first network node and the second network node are terrestrial network nodes or both of the first network node and the second network node are non-terrestrial network nodes may be included in the scope of the present disclosure.

As shown in FIG. 12, for example, the terrestrial network cells 1215-1 and 1215-2 may be included in the non-terrestrial network cell 1225. The terrestrial network cells 1215-1 and 1215-2 may indicate the coverage of the terrestrial network node 1210, and the terrestrial network cells 1215-1 and 1215-2 may also be distinguished into a first region 1215-1 and a second region 1215-2. For example, the second region 1215-2 may be a cell edge of the terrestrial network cells, and the channel state between the terrestrial network node 1210 and the UE in the second region may be degraded in comparison with the first region. In the wireless communication system, a UE may be positioned in the first region 1215-1 of the terrestrial network cells 1215-1 and 1215-2 like the UE 1230-1, may be positioned in the second region 1215-2 of the terrestrial network cells 1215-1 and 1215-2 like the UE 1230-2, and may be positioned in the non-terrestrial network cell 1225 out of the terrestrial network cells 1215-1 and 1215-2 like the UE 1230-3.

In the wireless communication system 1200 including the terrestrial network cell and the non-terrestrial network cell according to an embodiment of the present disclosure, an efficient switching method between network cells is required. For example, as shown in FIG. 1, in the case that the UE is positioned in the second region 1215-2 of the terrestrial network cells 1215-1 and 1215-2, the UE may have a channel state not better than that of in the first region 1215-1 and may not perform efficient data transmission and reception. Furthermore, even in the case that a channel quality of a required level is attained in the second region 1215-2, it may be more beneficial to establish a connection with the non-terrestrial network node 1220 more quickly in comparison with leaving the terrestrial network cells 1215-1 and 1215-2.

Figure 13:
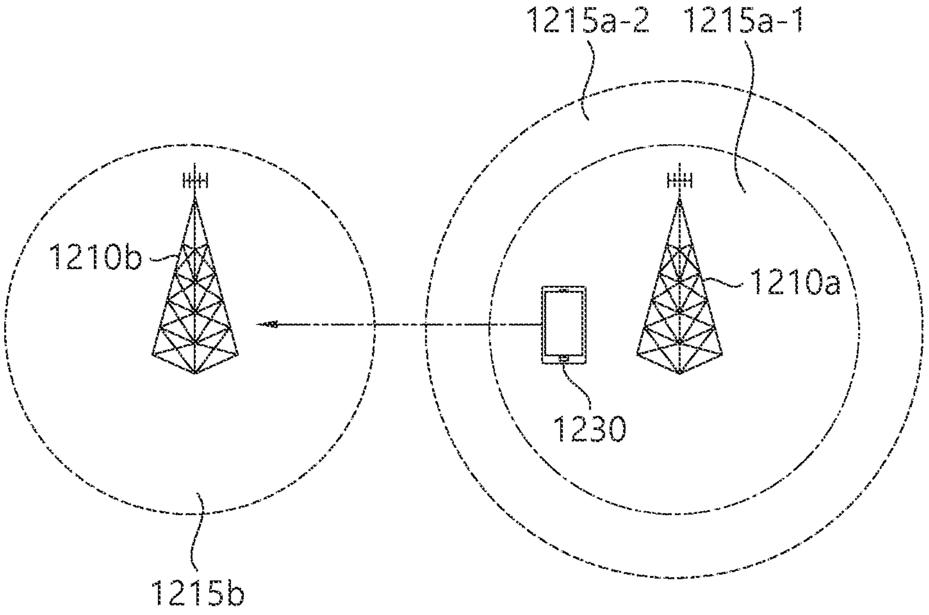
FIG. 13 is an exemplary diagram illustrating a coverage hole between multiple network nodes.

Meanwhile, FIG. 13 is an exemplary diagram illustrating a coverage hole between multiple network nodes. As shown in FIG. 13, a third network cell **1215*b* served by a third network node 1210*b* may be positioned around network cells 1215*a*-1 and 1215*a*-2 served by a terrestrial network node 1210*a*. According to an aspect, a situation may occur that a UE 1230 moves toward a third cell 1215*b* going through a second region 1215*a*-2 from a third region 1215*a*-1. Here, an empty region, which is not covered by any network nodes, may be existed between the second region 1215*a*-2 and the third region 1215*a*-1**, and the UE may lose the network access. According to the wireless communication system according to an embodiment of the present disclosure, the empty region of coverage may be covered by a non-terrestrial network node.

In the various embodiments including the features described with reference to FIG. 12 and FIG. 13, it may be required an efficient switching method between network nodes or a method of selecting a target network node for an initial access. That is, for example, the UE is required to switch the connection state with the terrestrial network node 1210 to the connection state with the non-terrestrial network node 1220 efficiently according to a specific criterion. Alternatively, the UE is required to determine a connection with a certain network node to initialize a connection with a network node. Here, for example, the connection state switching may include switching from a single connection state to a dual connectivity state, for example, switching from a single connection state with the terrestrial network node 1210 to the dual connectivity state with the terrestrial network node 1210 and the non-terrestrial network node 1220. In addition, selecting the target network node for an initial access may also include a connection initialization to the terrestrial network node 1210 and an initial access of the dual connectivity state with the terrestrial network node 1210 and the non-terrestrial network node 1220.

According to an embodiment of the present disclosure, the connection state switching or the target network node selection may be based on a channel measurement value (for example, Reference Signal Received Power; RSRP) and determined by comparing the measurement value with a threshold value. For example, the UE may be configured to select a connection target based on the comparison result between the measurement value of a channel state and a threshold value between the UE and the terrestrial network node 1210 or to switch the connection state. According to an aspect, the measurement for a channel state may be performed based on a measurement for a reception power of a reference signal, but is not limited thereto.

For example, the UE may be configured to measure a reception power for a reference signal from the terrestrial network node 1210 and to transmit and receive data by accessing the terrestrial network node 1210 when the measurement value of the reference signal reception power is greater than the threshold value. Meanwhile, when the measurement value of the reference signal reception power is smaller than the threshold value, the UE may be configured to transmit and receive data by accessing the non-terrestrial network node 1220. Alternatively, when the measurement value of the reference signal reception power is smaller than the threshold value, the UE may be configured to transmit and receive data with the terrestrial network node 1210 and/or the non-terrestrial network node 1220 by establishing a dual connectivity for the non-terrestrial network node 1220 and the terrestrial network node 1210.

Here, for example, the signal measured to determine the cell selection or the connection state switching may be a Synchronization Signal Block (SSB) from the terrestrial network node 1210 or other reference signal (for example, Channel State Information Reference Signal (CSI-RS)), but is not limited thereto. In the present disclosure, for the convenience of description, a 'reference signal' may be designated, but the reference signal may include an arbitrary signal measured to determine the cell selection or the connection state switching. Meanwhile, according to an embodiment, the threshold value may be set to a specific value of the reception power for the Synchronization Signal Block (SSB) from the terrestrial network node 1210, for example, a non-terrestrial network threshold value, or for example, may be referred to RSRP-ThresholdSSB-NTN, but is not limited thereto. According to an embodiment, the UE may be configured to measure a reception power for a reference signal from the terrestrial network node 1210 and to transmit and receive data by accessing the terrestrial network node 1210 when the measurement value is greater than the threshold value and to transmit and receive data by accessing the non-terrestrial network node 1220 when the measurement value is smaller than the threshold value, or establish the dual connectivity for the terrestrial network node 1210 and the non-terrestrial network node 1220. In addition, in the state that the UE establishes the dual connectivity for the terrestrial network node 1210 and the non-terrestrial network node 1220, when the measurement value is smaller than the threshold value, the UE may be configured to terminate the connection with the terrestrial network node 1210 and maintain the connection with the non-terrestrial network node 1220 only.

Here, the data transmission and reception may include a transmission of a random access preamble (for example, PRACH) to the network node by the UE. That is, the UE may be configured to determine a target network node for performing a random access based on a threshold value. However, in the present disclosure, the data transmission and reception are not limited to the random access procedure, and various communication procedures in which a target network node for data transmission and reception is selected based on a reception power for a signal from a specific network node may be included in the inventive concept of the present disclosure.

Meanwhile, in order for the UE to perform an initial access with the terrestrial network node 1210 and/or the non-terrestrial network node 1220 or to perform data transmission and reception, cell-specific information related to the terrestrial network node 1210 and/or the non-terrestrial network node 1220 needs to be forwarded to the UE from the network node. According to an aspect, before the UE determines a target network node based on a reference signal reception power, the cell-specific information related to the terrestrial network node 1210 and/or the non-terrestrial network node 1220 may be forwarded to the UE from the network node.

According to an aspect, each of the terrestrial network node 1210 and/or the non-terrestrial network node 1220 may transmit the respective cell-specific information to the UE. For example, the terrestrial network node 1210 may transmit the cell-specific information for the terrestrial network node 1210 to the UE, and the non-terrestrial network node 1220 may transmit the cell-specific information for the non-terrestrial network node 1220 to the UE.

In addition, according to an aspect, either one of the terrestrial network node 1210 or the non-terrestrial network node 1220 may transmit the cell-specific information for the terrestrial network node 1210 and the non-terrestrial network node 1220 to the UE. For example, the terrestrial network node 1210 may transmit the cell-specific information for the terrestrial network node 1210 and the non-terrestrial network node 1220 together to the UE. Accordingly, the UE may measure a reception power for a reference signal from the terrestrial network node 1210, and when the measurement value is smaller than a threshold value, the UE may initialize an access to the non-terrestrial network node 1220 or perform data transmission and reception without a separate procedure of acquiring cell-specific information.

According to an aspect, the UE may be configured to store the cell-specific information from the terrestrial network node 1210 and/or the non-terrestrial network node 1220 in a memory, and reuse the cell-specific information on a required time. For example, the UE may receive the cell-specific information related to the terrestrial network node 1210 and/or the non-terrestrial network node 1220 from the terrestrial network node 1210 and store the received cell-specific information in a memory. In response to the determination that a measurement result of a reference signal is greater than a threshold value, the UE may perform an access to the terrestrial network node 1210 or perform data transmission and reception. However, the measurement value when the reference signal is measured again after a predetermined time may be smaller than the threshold value, and in this case, the UE may be configured to access the non-terrestrial network node 1220 based on the cell-specific information related to the non-terrestrial network node 1220 stored in the memory. For example, in the embodiment in which the non-terrestrial network node 1220 may have relatively large coverage like a stationary satellite or an unmanned aerial vehicle (UAV) or stay for a relatively long time at a specific position, the storage and reuse of the cell-specific information by the UE may be implemented more beneficially.

Meanwhile, according to an aspect, the terrestrial network node 1210 may be configured to store the cell-specific information and pattern information for at least one non-terrestrial network node 1220 configured to have a layover in a related region of the terrestrial network node 1210 and transmit the cell-specific information and/or the pattern information for the non-terrestrial network node to the UE. Here, the related region of the terrestrial network node may be a set of the positions of the non-terrestrial network node which the UE in connection with the terrestrial network node may access, for example.

For example, in the case that a time for staying on a specific terrestrial region is relatively short like a low earth orbit satellite, since an access or data transmission and reception with the UE is available only in the period during which the low earth orbit satellite stays on a specific region, the information of moving schedule of the low earth orbit satellite may be required. For example, the terrestrial network node 1210 may be configured to store a period of staying time for the related region of one or more low earth orbit satellites that pass through the terrestrial network node, the pattern information including at least one of a moving path or a moving speed of the low earth orbit satellite, and the cell-specific information including information for accessing the low earth orbit satellite. The terrestrial network node 1210 may transmit the cell-specific information and/or the pattern information for the non-terrestrial network node to the UE. For example, according to an aspect, the terrestrial network node 1210 may transmit the cell-specific information and the pattern information to the UE, and the UE may select the accessible cell-specific information according to the pattern information and perform an access to the non-terrestrial network node or data transmission and reception. Alternatively, the terrestrial network node 1210 may be configured to determine the non-terrestrial network node for which the UE may perform an access or data transmission and reception based on the pattern information and transmit the determined cell-specific information for the non-terrestrial network node to the UE. According to an aspect, the terrestrial network node 1210 may determine information for an accessible time length together with the determination of the non-terrestrial network node accessible by the UE and transmit the determined information for an accessible time length to the UE together. In addition, the terrestrial network node 1210 may be configured to drive a timer based on the accessible time length and transmit the cell-specific information for a newly accessible non-terrestrial network node to the UE again before a predetermined time before the timer expires.

The configuration may be related to the storage of the cell-specific information by the UE and the storage of the cell-specific information by the specific network node, and the transmission may be applied to various procedures of a wireless communication system such as a handover procedure as well as the random access procedure.

Meanwhile, here, the cell-specific information may include time information and/or frequency information for an initial access or data transmission and reception. For example, the cell-specific information may include information for a random access occasion (R.O) for transmitting a random access preamble and may include information for a frequency band for an uplink to the terrestrial network node 1210 and/or the non-terrestrial network node 1220. In addition, according to an aspect, the cell-specific information may include random access configuration information, and the threshold value for the access initialization or the connection state switching described above may be included in the random access configuration information.

Figure 14:
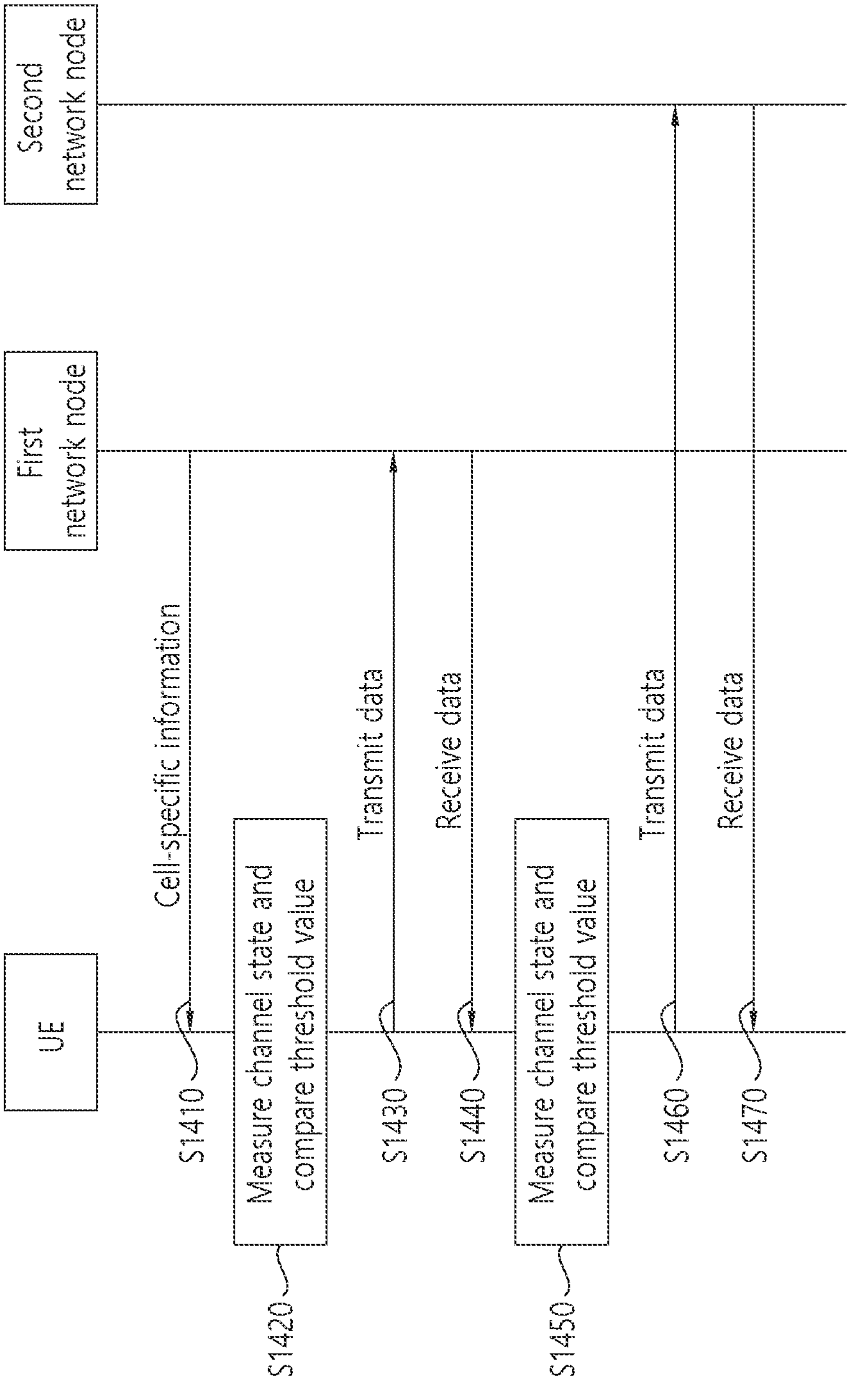
FIG. 14 is a first exemplary diagram illustrating an information flow between a network and a UE according to an embodiment of the present disclosure.

FIG. 14 is a first exemplary diagram illustrating an information flow between a network and a UE according to an embodiment of the present disclosure. As shown in FIG. 14, a first network node may transmit cell-specific information to the UE (step S1410). Here, for example, the first network node may be the terrestrial network node 1210 and a second network node may be the non-terrestrial network node 1220, and the cell-specific information may include cell-specific information for both of the terrestrial network node 1210 and/or the non-terrestrial network node 1220. For example, the UE may measure a channel state with the terrestrial network node 1210 and compare the measurement value for the channel state with a threshold value (step S1420). The measurement for the channel state may be a measurement of a reception power for a reference signal, for example. In response to the determination that the measurement value for the channel state is greater than the threshold value, the UE may transmit data to the terrestrial network node 1210 (step S1430) and receive data from the terrestrial network node 1210 (step S1440). For example, in the case that the UE performs random access based on the channel measurement value (for example, RSRP or RSRQ) and the threshold value, for example, when the channel measurement value is greater than the threshold value, the UE may transmit a random access preamble to the terrestrial network node 1210 (step S1430) and receive a random access response from the terrestrial network node 1210 (step S1440).

Subsequently, the UE that accesses the terrestrial network node 1210 measures a channel state with the terrestrial network node 1210 again and compares the measurement value with the threshold value (step S1450). In response to the determination that the measurement value for the channel state is smaller than the threshold value, the UE may transmit data to the non-terrestrial network node 1220 (step S1460) and receive data from the non-terrestrial network node 1220 (step S1470). Here, the UE may be configured to establish a dual connectivity with the terrestrial network node and the non-terrestrial network node and perform data transmission and reception with both of the terrestrial network node and the non-terrestrial network node, or release a connection with the terrestrial network node and perform data transmission and reception with the non-terrestrial network node. Meanwhile, when the channel state is greater than the threshold value, the UE may continue to perform data transmission and reception with the terrestrial network node 1210. So far, the embodiment in the connection state with the terrestrial network node is described, but the opposite case, that is, the embodiment in which the UE that accesses the non-terrestrial network node measures a channel state with the non-terrestrial network node and establishes a dual connectivity with the terrestrial network node and the non-terrestrial network node according to the comparison between the measurement value and the threshold value or switch the target access to the terrestrial network node, may also be included in the inventive concept of the present disclosure.

Figure 15:
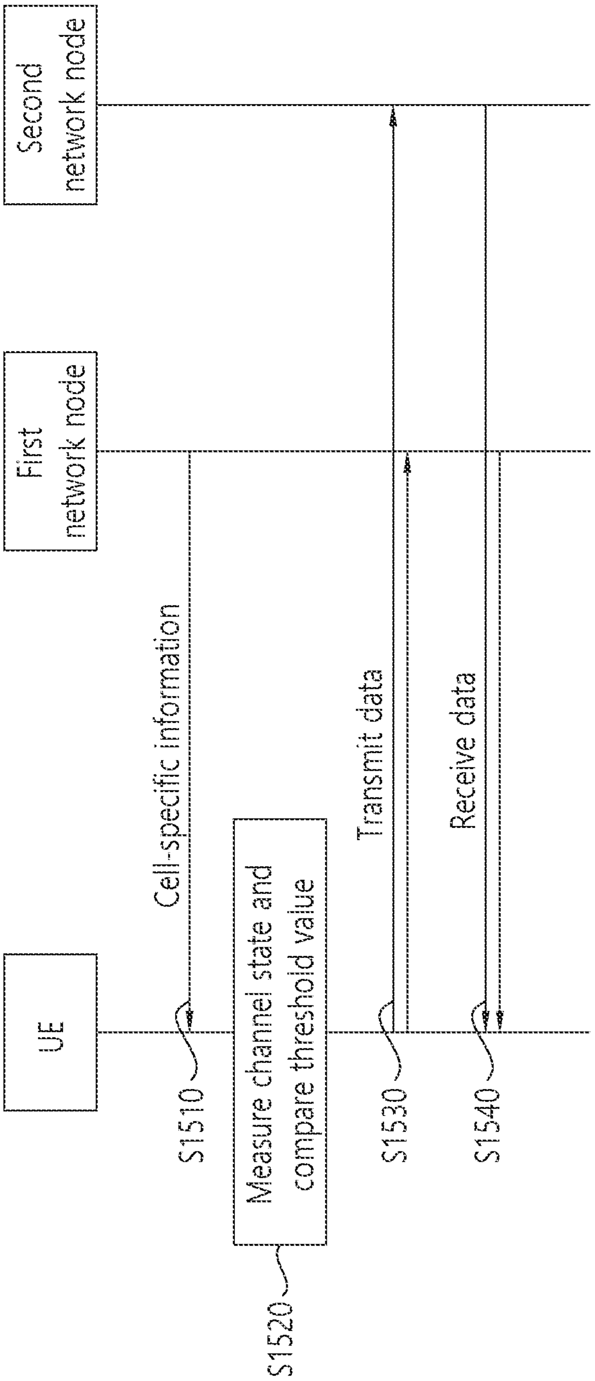
FIG. 15 is a second exemplary diagram illustrating an information flow between a network and a UE according to an embodiment of the present disclosure.

Meanwhile, FIG. 15 is a second exemplary diagram illustrating an information flow between a network and a UE according to an embodiment of the present disclosure. Like in FIG. 14, a first network node may transmit cell-specific information to the UE (step S1510), and the UE may measure a channel state (for example, RSRP) and compare the measurement value with a threshold value (step S1520). As an example of the random access procedure, in the case that a reception power measurement value for a reference signal from the terrestrial network node 1210 is smaller than the threshold value, the UE may transmit a random access preamble to the non-terrestrial network node 1220 (step S1530) and receive a random access response from the non-terrestrial network node 1220 (step S1540). Therefore, without going through a separate process by the non-terrestrial network node 1220 or the terrestrial network node 1210 (for example, handover procedure or additional cell-specific information transmission), the UE may perform an initial access to the non-terrestrial network node 1220 or perform switching of a connection state only based on the reception power measurement result for the reference signal from the terrestrial network node 1210. Furthermore, according to an aspect, the UE may be configured to establish a dual connectivity (DC) by further establishing a connection for the non-terrestrial network node 1220 while maintaining the connection with the terrestrial network node 1210 and perform data transmission and reception with both of the terrestrial network node 1210 and the non-terrestrial network node 1220.

Figure 16:
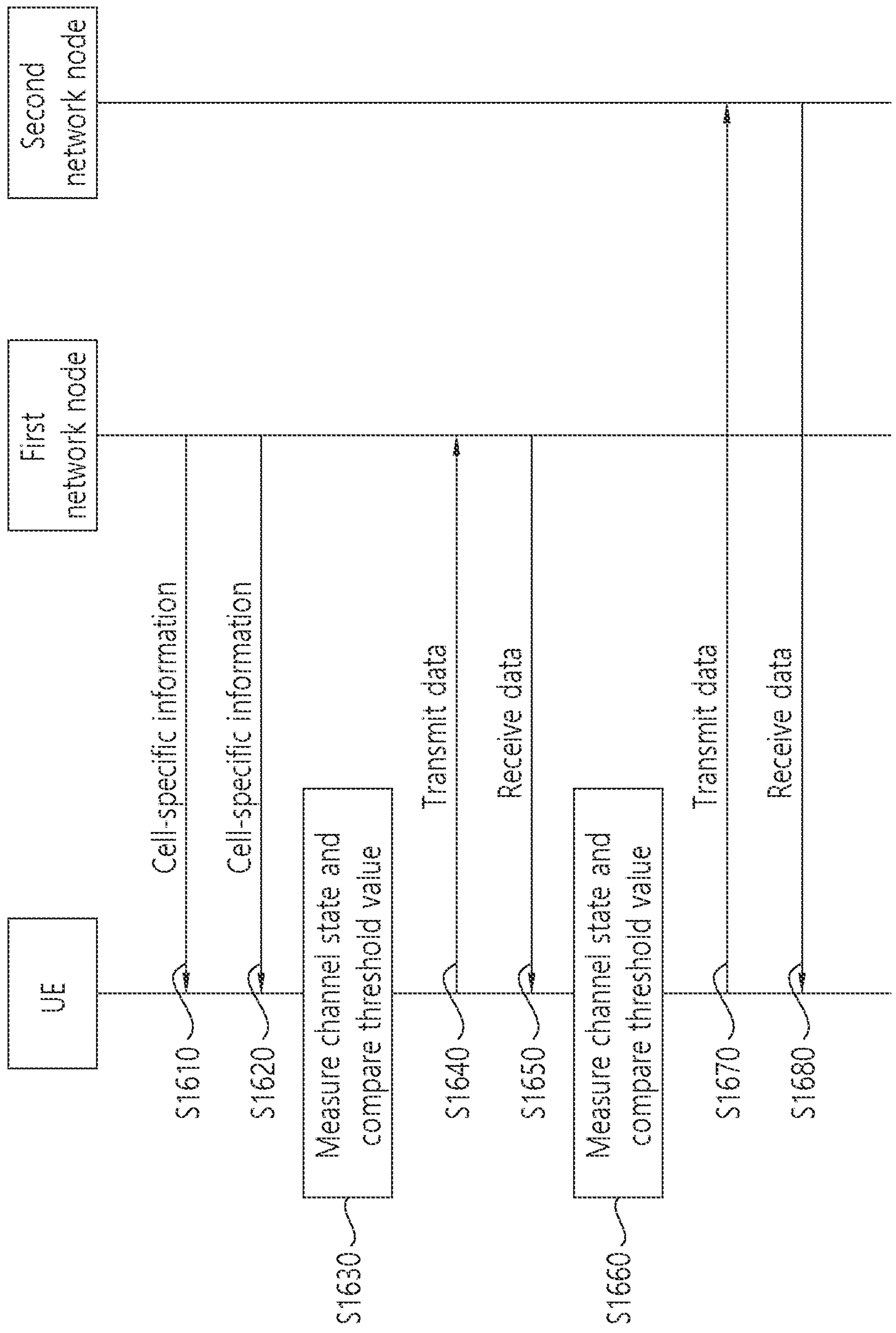
FIG. 16 is a third exemplary diagram illustrating an information flow between a network and a UE according to an embodiment of the present disclosure.

According to another embodiment, the cell-specific information may be separately transmitted from each of the network nodes to the UE. FIG. 16 is a third exemplary diagram illustrating an information flow between a network and a UE according to an embodiment of the present disclosure. As shown in FIG. 16, a first network node may transmit cell-specific information for the first network node to the UE (step S1610), and a second network node may transmit cell-specific information for the second network node to the UE (step S1620). For example, the UE may measure a channel state with the terrestrial network node 1210 and compare the measurement value for the channel state with a threshold value (step S1630). The measurement of the channel state may be a measurement of a reception power for a reference signal, for example. In response to the determination that the measurement value for the channel state is greater than the threshold value, the UE may transmit data to the first network node (step S1640) and receive data from the first network node (step S1650). For example, to perform the random access procedure, in response to the determination that the reception power measurement result for the reference signal from the first network node is greater than the threshold value, the UE may transmit a random access preamble to the first network node (step S1640) and receive a random access response from the first network node (step S1650).

Subsequently, the UE that accesses the terrestrial network node 1210 measures a channel state with the terrestrial network node 1210 again and compares the measurement value with the threshold value (step S1660). In response to the determination that the measurement value for the channel state is smaller than the threshold value, the UE may transmit data to the non-terrestrial network node 1220 (step S1670) and receive data from the non-terrestrial network node 1220 (step S1680). Here, the UE may be configured to establish a dual connectivity with the terrestrial network node and the non-terrestrial network node and perform data transmission and reception with both of the terrestrial network node and the non-terrestrial network node, or release a connection with the terrestrial network node and perform data transmission and reception with the non-terrestrial network node. Meanwhile, when the channel state is greater than the threshold value, the UE may continue to perform data transmission and reception with the terrestrial network node 1210. So far, the embodiment in the connection state with the terrestrial network node is described, but the opposite case, that is, the embodiment in which the UE that accesses the non-terrestrial network node measures a channel state with the non-terrestrial network node and establishes a dual connectivity with the terrestrial network node and the non-terrestrial network node according to the comparison between the measurement value and the threshold value or switch the target access to the terrestrial network node, may also be included in the inventive concept of the present disclosure.

Figure 17:
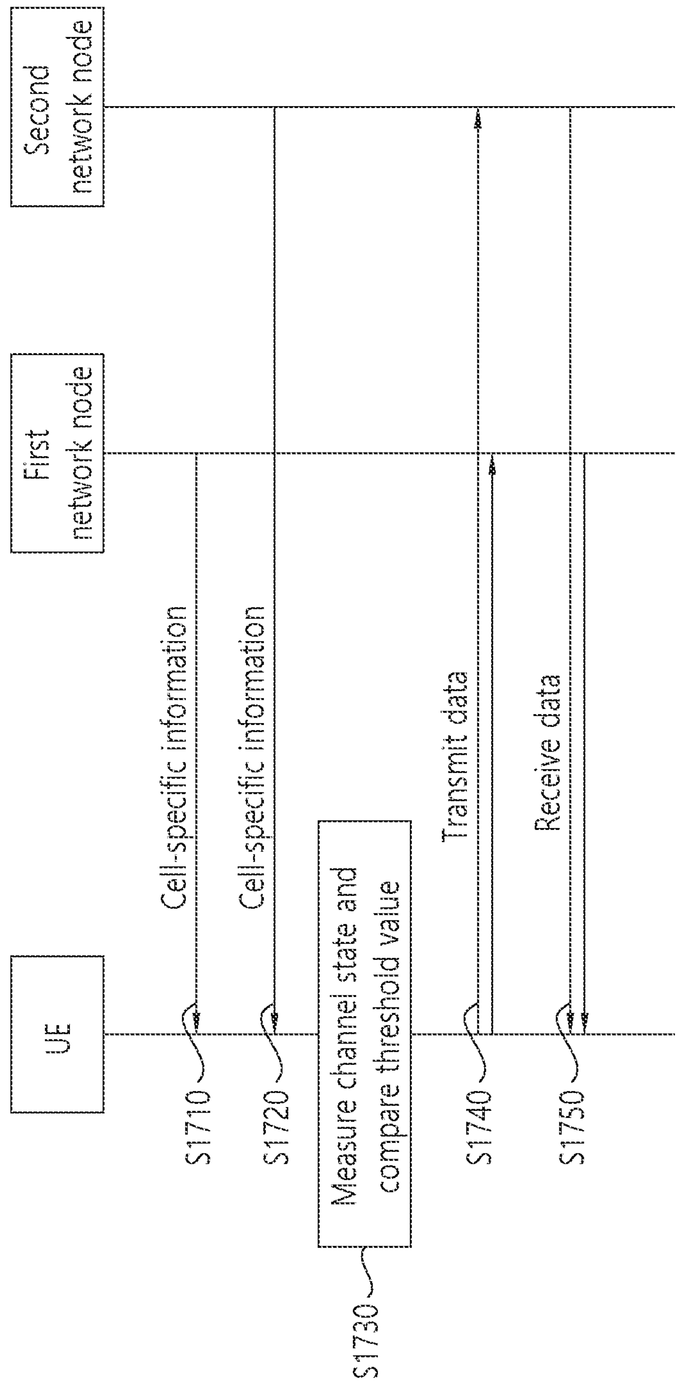
FIG. 17 is a fourth exemplary diagram illustrating an information flow between a network and a UE according to an embodiment of the present disclosure.

Meanwhile, FIG. 17 is a fourth exemplary diagram illustrating an information flow between a network and a UE according to an embodiment of the present disclosure. Like in FIG. 16, a first network node may transmit cell-specific information for the first network node to the UE (step S1710), and a second network node may transmit cell-specific information for the second network node to the UE (step S1720). For example, the UE may measure a channel state with the first network node (for example, reception power measurement for a reference signal) and compare the measurement value with a threshold value (step S1730). In response to the determination that the measurement value for the channel state is smaller than the threshold value, the UE may transmit data to the second network node (step S1740) and receive data from the second network node (step S1750). For example, to perform the random access procedure, in response to the determination that the reception power measurement result for the reference signal from the first network node is smaller than the threshold value, the UE may transmit a random access preamble to the second network node (step S1740) and receive a random access response from the second network node (step S1750).

Furthermore, according to an aspect, the UE may be configured to establish a dual connectivity (DC) by further establishing a connection for the non-terrestrial network node 1220 while maintaining the connection with the terrestrial network node 1210 and perform data transmission and reception with both of the terrestrial network node 1210 and the non-terrestrial network node 1220.

Meanwhile, according to an embodiment of the present disclosure, for example, the connection state switching or the target node selection may be implemented together with a beam recovery procedure. For example, in the 5G NR communication system, to solve the coverage secure problem according to the use of higher frequency, various forms of beamforming may be applied. For example, the terrestrial network node 1210 may transmit multiple beams within the terrestrial network cell 1215, and the UE may access the terrestrial network node 1210 based on a specific beam. However, the beam management failure situation in which the UE fail to lose an access to a specific beam may occur, and in the beam management failure situation, the UE tries a beam failure recovery, and if the UE fails the beam failure recovery, the UE may lose the coverage. According to an aspect, a timer may be configured to be driven in the beam management failure situation, and when the timer expires, it is configured that the NTN mode is started. That is, when the beam management failure situation occurs in the UE in relation to the terrestrial network node 1210, a predetermined first timer is started, and when the first timer expires, an access to the non-terrestrial network node 1220 may be started or the UE transmits and receives data. As described above, since the UE may be configured to receive the respective cell-specific information for the terrestrial network node 1210 and the non-terrestrial network node 1220 from the terrestrial network node 1210 or from the terrestrial network node 1210 and/or the non-terrestrial network node 1220, when the beam management failure situation occurs and a predetermined timer expires, without any separate procedure, the UE may start an access to the non-terrestrial network node 1220 or transmit and receive data. Meanwhile, according to an aspect, in the beam failure situation, when the first timer is driven and the timer expires, the reception power for the reference signal from the terrestrial network node 1210 or the non-terrestrial network node 1220 is measured, and through the comparison with the threshold value, the UE may start an access to the terrestrial network node 1210 and/or the non-terrestrial network node 1220 or transmit and receive data.

According to an embodiment of the present disclosure, the reception power for the reference signal from the network node may be measured, and whether to start an access to the terrestrial network node 1210 and/or the non-terrestrial network node 1220 or transmit and receive data may be determined, without any separate command or process (for example, handover or cell reselection) from the network node, the UE may switch or select a target network node quickly.

Meanwhile, according to an embodiment of the present disclosure, the UE may be an unmanned air vehicle including a drone, for example. Accordingly, the cell-specific information for the terrestrial network node 1210 and the non-terrestrial network node 1220 are transmitted together from the terrestrial network node 1210 to the drone, and the drone and the terrestrial network node 1210 perform data transmission and reception, but in the case that the access to the terrestrial network node 1210 is degraded, the drone may start an access to the non-terrestrial network node 1220 based on the cell-specific information for the non-terrestrial network node 1220 or perform data transmission and reception. For example, in response to the determination that the reception power for the reference signal from the terrestrial network node 1210 is a threshold value or smaller, the drone may start an access to the non-terrestrial network node 1220 or perform data transmission and reception.

In addition, according to an embodiment of the present disclosure, a tracking area code (TAC) may be configured to be correlated between the terrestrial network node 1210 and the non-terrestrial network node 1220. According to an aspect, the TAC correlation is referred, between the network nodes in the cells in a specific region (for example, terrestrial network cell) and the network node of the non-terrestrial network cell that covers the cells thoroughly, and this may be utilized in paging. For example, the terrestrial network node 1210 may transmit a paging message to the UE and attempt to perform paging. In the case that the terrestrial network node 1210 fails to perform paging for the UE, the non-terrestrial network node 1220 in relation to the terrestrial network node 1210 may transmit a paging message to the UE and perform paging for the UE. In this case, the terrestrial network node 1210 may transmit information of its own paging failure or a message for performing paging to the non-terrestrial network node 1220, and the non-terrestrial network node 1220 may perform paging.

Figure 18:
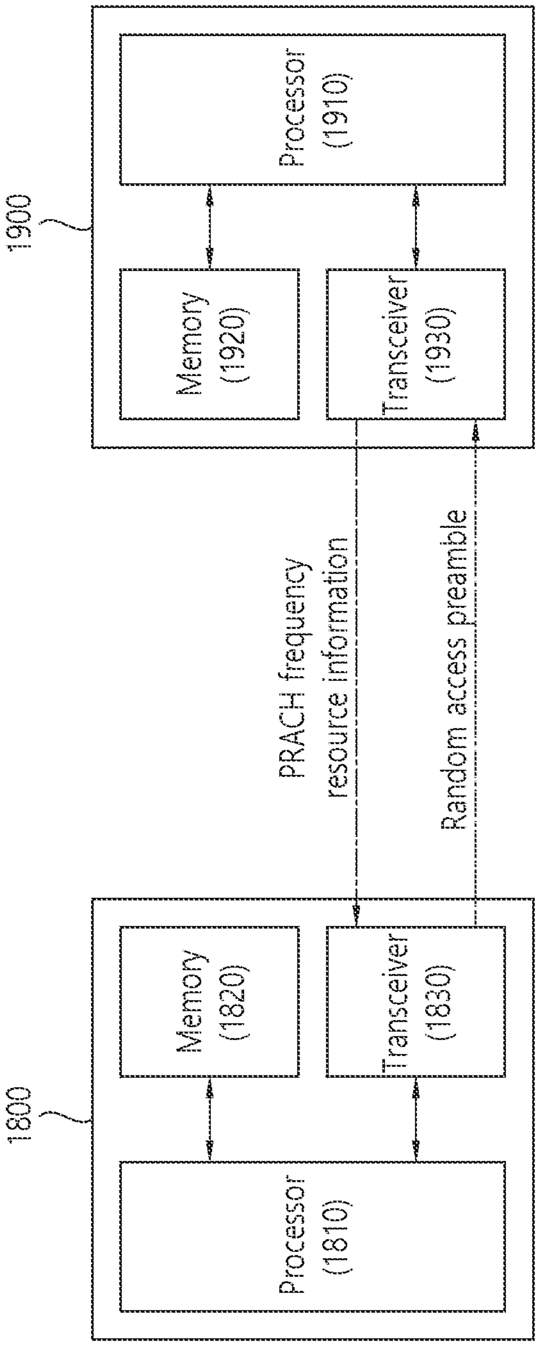
FIG. 18 illustrates a UE and a network node for which the embodiment of the present disclosure is implemented.

FIG. 18 illustrates a UE and a network node for which the embodiment of the present disclosure is implemented.

Referring to FIG. 18, a UE 1800 includes a processor 1810, a memory 1820, and a transceiver 1830. The processor 1810 may be configured to implement the function, process, and/or method described in the present disclosure. The layers in a radio interface protocol may be implemented in the processor 1810.

The memory 1820 is connected to the processor 1810 and stores various types of information to drive the processor 1810. The transceiver 1830 is connected to the processor 1810 and transmits a radio signal to a network node 1900 or receives a radio signal from the network node 1900.

The network node 1900 includes a processor 1910, a memory 1920, and a transceiver 1930. In the present embodiment, the network node 1900 is a non-terrestrial network node and may include an artificial satellite that performs a radio access procedure according to the present disclosure. Alternatively, in the present embodiment, the network node 1900 is a terrestrial network node and may include a base station that performs a radio access procedure according to the present disclosure.

The processor 1910 may be configured to implement the function, process, and/or method described in FIG. 8 and the present disclosure. The layers in a radio interface protocol may be implemented in the processor 1910. The memory 1920 is connected to the processor 1910 and stores various types of information to drive the processor 1910. The transceiver 1930 is connected to the processor 1910 and transmits a radio signal to the UE 1800 or receives a radio signal from the UE 1800.

The processor 1810 or 1910 may include an application-specific integrated circuit (ASIC), other chipsets, logic circuits, and/or data processing devices. The memory 1820 or 1920 may include a read-only memory (ROM), a random access memory (RAM), a flash memory, a memory card, a storage medium, and/or other storage devices. The transceiver 1830 or 1930 may include a baseband circuit for processing a radio signal. When an embodiment of the present disclosure is implemented as software, the above-described technique may be implemented as a module (a process, a function, etc.) that performs the above-described functions. The module may be stored in the memory 1820 or 1920 and executed by the processor 1810 or 1910. The memory 1820 or 1920 may be provided inside or outside the processor 1810 or 1910 and may be connected to the processor 1810 or 1910 by various well-known means.

In the exemplary system described above, the methods are described as a series of steps or blocks based on flowcharts, but the present disclosure is not limited to the order of steps, and some steps may occur in a different order or concurrently with other steps as described above. In addition, those skilled in the art will understand that the steps shown in the flowcharts are not exclusive and that other steps may be included or one or more steps in the flowcharts may be deleted without affecting the scope of the present disclosure.

What is claimed is:

1. A method for performing handover by a user equipment (UE), in a communication system including a non-terrestrial network, the method comprising:

receiving, from a first base station, information about at least one cell of a second base station accessible by the UE;

receiving, from the first base station, information about a time duration used by the UE to determine handover to the at least one cell of the second base station, the handover occurring only within the time duration;

obtaining a measurement value by measuring a signal of the at least one cell of the second base station;

comparing the measurement value to a threshold;

determining, based on the comparison result and the information about the time duration, a cell from the at least one cell of the second base station; and performing handover to the determined cell of the second base station based on information about the determined cell of the second base station without a command from the first base station when the UE determines that both (i) the comparison result satisfies the handover execution condition and (ii) a time at which the handover is performed is within the time duration, the information about the determined cell of the second base station being included in the information about the at least one cell of the second base station received from the first base station.

2. The method of claim 1, further comprising:

receiving pattern information about the second base station from the first base station, wherein the pattern information includes at least one of the movement path and movement speed of the second base station.

3. The method of claim 1, further comprising:

determining to perform the handover if the measurement value is greater than the threshold.

4. The method of claim 1, wherein the measured value and the threshold value are based on Reference Signal Received Power (RSRP).

5. The method of claim 1, wherein the first base station is a terrestrial network base station, and the second base station is a non-terrestrial network base station.

6. The method of claim 5, further comprising:

processing the non-terrestrial network base station, using reference round-trip delay offset information in a medium access control (MAC) procedure.

7. The method of the claim 6, wherein the reference round-trip delay offset information is determined based on a difference between the time of transmitting a signal by a UE or a network node and the time of receiving the signal by the network or the UE.

8. The method of claim 6, wherein the reference round-trip delay offset information is received and included in system information.

9. A user equipment (UE) for performing handover, in a communication system including a non-terrestrial network, the UE comprising:

a transceiver configured to receive, from a first base station, information about at least one cell of a second base station accessible by the UE and receive from the first base station, information about a time duration used to determine handover to the at least one cell of the second base station, the handover occurring only within the time duration; and a processor configured to:

obtain a measurement value by measuring a signal of the at least one cell of the second base station;

compare the measurement value to a threshold;

determine, based on the comparison result and the information about the time duration, a cell from the at least one cell of the second base station; and perform handover to the determined cell of the second base station based on the received information about the determined cell of the second base station without a command from the first base station when the UE determines that both (i) the comparison result satisfies the handover execution condition and (ii) a time at which the handover is performed is within the time duration, the information about the determined cell of the second base station being included in the information about the at least one cell of the second base station received from the first base station.

10. The UE of claim 9, wherein the transceiver is further configured to receive pattern information about the second base station from the first base station, and wherein the pattern information includes at least one of the movement path and movement speed of the second base station.

11. The UE of claim 9, wherein the processor is further configured to determine to perform the handover if the measurement value is greater than the threshold.

12. The UE of claim 9, wherein the measured value and the threshold value are based on Reference Signal Received Power (RSRP).

13. The UE of claim 9, wherein the first base station is a terrestrial network base station, and the second base station is a non-terrestrial network base station.

14. The UE of claim 13, wherein the processor is further configured to process the non-terrestrial network base station, using reference round trip delay offset information in a medium access control (MAC) procedure.

15. The UE of the claim 14, wherein the reference round-trip delay offset information is determined based on a difference between the time of transmitting a signal by a UE or a network node and the time of receiving the signal by the network or the UE.

16. The UE of claim 14, wherein the reference round-trip delay offset information is received and included in system information.

* * * * *